United States Patent
Vagg

(10) Patent No.: US 9,928,124 B2
(45) Date of Patent: Mar. 27, 2018

(54) REVERTING TIGHTLY COUPLED THREADS IN AN OVER-SCHEDULED SYSTEM

(71) Applicant: CANON KABUSHIKI KAISHA, Tokyo (JP)

(72) Inventor: Richard John Vagg, Winston Hills (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 119 days.

(21) Appl. No.: 14/949,325

(22) Filed: Nov. 23, 2015

(65) Prior Publication Data

US 2016/0154678 A1 Jun. 2, 2016

(30) Foreign Application Priority Data

Nov. 28, 2014 (AU) .................................. 2014268246

(51) Int. Cl.
*G06F 9/46* (2006.01)
*G06F 9/54* (2006.01)

(52) U.S. Cl.
CPC ........ *G06F 9/546* (2013.01); *G06F 2209/548* (2013.01)

(58) Field of Classification Search
None
See application file for complete search history.

(56) References Cited

U.S. PATENT DOCUMENTS

| 7,161,705 | B2 | 1/2007 | Klassen | |
| 8,843,927 | B2 * | 9/2014 | Radmilac | G06F 11/3466 709/223 |
| 2007/0169123 | A1 * | 7/2007 | Hopkins | G06F 9/52 718/100 |
| 2012/0185709 | A1 | 7/2012 | Weissmann et al. | |

* cited by examiner

*Primary Examiner* — Gregory A Kessler
(74) *Attorney, Agent, or Firm* — Canon U.S.A., Inc. IP Division

(57) ABSTRACT

A computer implemented method of processing a first task and a second task, by processing, in a parallel processing mode, the first task using a producer thread and the second task using a consumer thread, the threads running concurrently and communicating using a message queue configured to store a number of messages produced by the producer thread to be processed by the consumer thread; successively processing, in a serial processing mode, both the first task and the second task using the producer thread, if at least one transition of an occupancy state of the message queue from substantially full to substantially empty is detected; and reverting to processing the tasks in the parallel processing mode if, while the tasks are being processed in the serial processing mode, the consumer thread is operating concurrently with the producer thread.

11 Claims, 16 Drawing Sheets

Fig. 7

 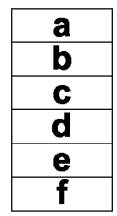 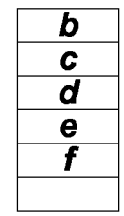
Fig. 13A    Fig. 13B    Fig. 13C
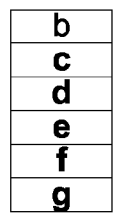 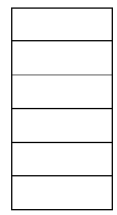 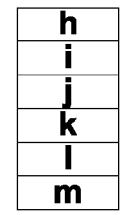
Fig. 13D    Fig. 13E    Fig. 13F
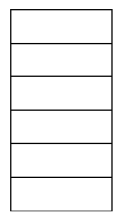
Fig. 13G

  
Fig. 14A     Fig. 14B     Fig. 14C
  
Fig. 14D     Fig. 14E     Fig. 14F
  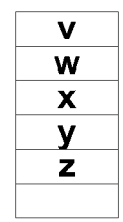
Fig. 14G     Fig. 14H     Fig. 14I

REVERTING TIGHTLY COUPLED THREADS IN AN OVER-SCHEDULED SYSTEM

REFERENCE TO RELATED PATENT APPLICATION(S)

This application claims the benefit under 35 U.S.C. § 119 of the filing date of Australian Patent Application No. 2014268246, filed 28 Nov. 2014, hereby incorporated by reference in its entirety as if fully set forth herein.

TECHNICAL FIELD

The present invention relates generally to the field of executing multi-threaded applications on an operating system, and, in particular, to a method of operating tightly coupled threads in an over-scheduled environment.

BACKGROUND

Print rendering systems convert documents expressed in a Page Description Language (PDL) into pixels rendered onto a physical page. Trends in microprocessor designs are directed towards increasing the number of processing cores in a system rather than increasing the capabilities of an individual processor core. Therefore, a modern print rendering system algorithm needs to take advantage of this by efficiently utilising as many processing cores as possible to gain the best performance from a system.

To achieve efficient processor utilisation, print rendering systems must efficiently divide the rendering work between processors in a way that allows each processor to operate as independently as possible. When there are sufficient free processors on a system, this load state of the system, being referred to as "under-scheduled", multiple threads are able to communicate freely and performance is optimised because the threads can operate without having to wait for each other. When the system is over-scheduled and there are more active threads than processors, the multiple threads do not run concurrently.

The situation is complicated when the software is operating on virtualised hardware. Hardware virtualisation allows multiple operating systems to run independently on a single computer, managed by a virtualisation supervisor. A virtualisation supervisor is responsible for assigning resources, such as memory and processors, to each operating system instance. Hardware virtualisation is a common technique in cloud computing, where computing resource is sold as a commodity. In a virtualised environment, operating system instances are isolated, and unaware of other running instances. As with the earlier description of an over-scheduled operating system, where there are more active threads than processors, the problem of over-scheduling also applies to hardware virtualisation when more processor resources are assigned than what is available.

SUMMARY

It is an object of the present invention to substantially overcome, or at least ameliorate, one or more disadvantages of existing arrangements.

Disclosed are arrangements, referred to hereinafter as Adaptive Single-Multi Threaded (ASMT) arrangements, which seek to address the above problems by determining if parallel threads are operating concurrently and, if not, switching to a single thread mode of operation until concurrency is restored.

The disclosed ASMT arrangements analyse a communication pattern between two threads to determine if the two threads are running concurrently, this indicating that the system hosting the threads is functioning normally and is not being over-scheduled. If the two threads are determined to not be running concurrently, meaning that the system is over-scheduled, then the tasks being processed in parallel on the two threads are processed in series on a single thread. While running in series the communication pattern continues to be analysed to see if the threads are again running concurrently, indicating that the load state of the system has reverted back from an over-scheduled state to an under-scheduled state. If the threads are determined to be running concurrently then the tasks revert to processing in parallel on the two threads.

According to a first aspect of the present invention, there is provided a computer implemented method of processing a first task and a second task, the method comprising the steps of: processing, in a parallel processing mode, the first task by a producer thread and the second task by a consumer thread, the threads running concurrently and communicating using a message queue configured to store a plurality of messages produced by the producer thread to be processed by the consumer thread; successively processing, in a serial processing mode, both the first task and the second task by the producer thread, if at least one transition of an occupancy state of the message queue from substantially full to substantially empty is detected; and reverting to processing the tasks in the parallel processing mode if, while the tasks are being processed in the serial processing mode, the consumer thread is operating concurrently with the producer thread.

According to another aspect of the present invention, there is provided an apparatus for processing a first task and a second task, the apparatus comprising: a plurality of processors; and a memory storing a computer executable program for performing a method comprising the steps of: processing, in a parallel processing mode, the first task by a producer thread and the second task by a consumer thread, the threads running concurrently and communicating using a message queue configured to store a plurality of messages produced by the producer thread to be processed by the consumer thread; successively processing, in a serial processing mode, both the first task and the second task by the producer thread, if at least one transition of an occupancy state of the message queue from substantially full to substantially empty is detected; and reverting to processing the tasks in the parallel processing mode if, while the tasks are being processed in the serial processing mode, the consumer thread is operating concurrently with the producer thread.

According to another aspect of the present invention, there is provided a computer program product including a computer readable medium having recorded thereon a computer program for implementing any one of the methods described above.

Other aspects of the invention are also disclosed.

BRIEF DESCRIPTION OF THE DRAWINGS

One or more embodiments of the invention will now be described with reference to the following drawings, in which:

FIG. 13A illustrates an example page;

FIG. 13B to FIG. 13G illustrates the occupancy states of the queue when going from parallel mode to serial mode processing methods when processing a page illustrated in FIG. 13A;

FIG. 14A to FIG. 14I illustrates the occupancy states of the queue when going from serial mode to parallel mode processing methods when processing a page illustrated in FIG. 13A.

DETAILED DESCRIPTION INCLUDING BEST MODE

Figure 1:
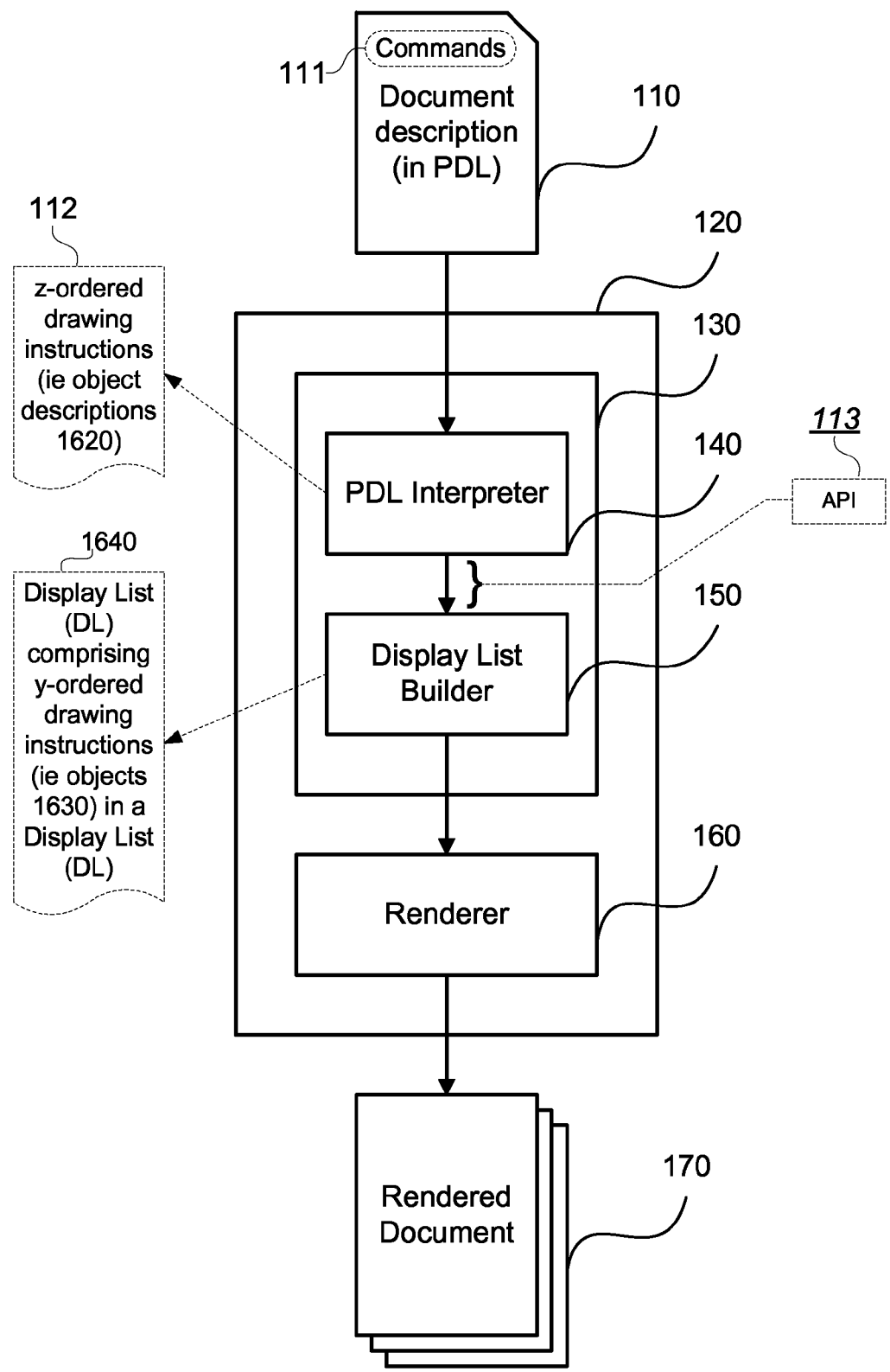
FIG. 1 is a schematic block diagram of a print rendering system.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which may form public knowledge through their respective publication and/or use. Such discussions should not be interpreted as a representation by the present inventor(s) or the patent applicant that such documents or devices in any way form part of the common general knowledge in the art.

Context

Software applications, including for example rendering applications, can execute on multi-core platforms if they are designed to do so. Such applications can, during execution, request a number of threads from the operating system. The operating system will allocate threads to the application in question. The operating system will schedule these threads for time periods determined by the operating system scheduler to specific processor cores. Depending upon the total number of active threads on the system these threads may or may not run on distinct cores. Once the application has been allocated these threads, the application may use the threads as it wishes, ie for the periods in which the scheduler schedules the threads.

The threads always exist on the system hosting the threads, however they may simply not always be scheduled to execute. In the disclosed ASMT arrangements, described hereinafter in more detail below, and considering an example of two tasks being executed in a producer/consumer arrangement, the application requests two threads and monitors the occupancy state of a message queue (320) by which the producer thread and the consumer thread communicate. Based upon the occupancy state, the application elects to either (a) execute the two tasks in a parallel processing mode, concurrently on the two threads, or (b) execute the two tasks in a serial processing mode, successively executing the two tasks on the producer thread, while making the consumer thread idle and monitoring the occupancy state of the queue to determine when to revert to the parallel processing mode. In the meantime, the operating system may schedule the idle consumer thread and the active producer thread to run concurrently depending on other threads active in the system.

A "thread" of execution is the smallest sequence of programmed instructions that can be managed independently by a scheduler (typically as part of an operating system). A thread can also be viewed as an execution sequence active in a processor (core). A single-core CPU can have only one thread active at a time. Accordingly, a 2-core CPU can have up to two threads active (one per core) at a time, but only one thread per core. Multi-threading enables more than one thread to execute on a single core, however only one thread can execute at any time, and the other threads must wait in the meantime.

Where rendering algorithms require threads to communicate with each other, mechanisms are put into place that minimise the need for threads to wait for each other. Commonly used primitives used to implement the inter-processor communication include mutexes, spin locks, and semaphores, which in turn can be used to construct more sophisticated inter-thread communication mechanisms such as a FIFO (First In First Out) queues or a Ring Buffers. Both FIFO queues and Ring Buffers are commonly used to implement what is commonly known, in computer science, as a producer-consumer pattern.

The producer-consumer pattern allows two threads to share work via a buffer such as a FIFO (queue). The producer thread performs a computing task, resulting in the production of a task for a consumer thread. The produced task is represented as a data structure that is stored in a message queue implemented, for example, using a FIFO. After inserting the task into the FIFO, the producer is free to continue performing the computing task resulting in the production of tasks for the consumer thread until the FIFO is full, or at least substantially full, at which point the producer must wait until there is space available in the FIFO. The consumer thread monitors the FIFO waiting for an item to be inserted by the producer. When an item becomes available, the consumer takes the item from the FIFO and performs a second computing task. The consumer continues to take items from the FIFO performing the second computing task until the FIFO is empty, or at least substantially empty. Operating in this way, the two threads can efficiently sharing the work, so long as the queue is neither full nor empty.

FIFOs can be used in pipeline architectures for processing of drawings. For example, when a typical Application Program Interface (API) call is made, the API call finishes before it is executed by the renderer. The API calls are inserted into a drawing pipeline, effectively a FIFO, for later execution by the renderer. This allows the API caller and the renderer to be decoupled, leading to better utilisation of processing resources. Both drawing APIs include provision for "flushing" the drawing pipeline, meaning that the flushing mechanism forces the API caller to wait until the drawing instructions in the pipeline have been fully processed.

In practice, processor cores used by a multitasking operating system are used by other tasks and have to be used for other purposes. This means that the producer and the consumer may not always be active even though the FIFO state allows both to continue operating. If there are more tasks (or threads) than processors, the system is described as being over-scheduled, meaning that not all tasks are able to execute simultaneously.

FIG. 1 shows an example of a rendering pipeline system 120. The input to the print rendering system 120 is a document description 110 expressed in a Page Description Language (PDL). Commonly used PDLs include the Adobe's Portable Document Format (PDF) and Microsoft's XML Paper Specification (XPS). The output of the print rendering system 120 is a rendered document 170 which can be in bitmap form or in any intermediate graphical representation. A typical intermediate graphical representation uses a format representing the document in a form other than a bitmap, this being produced by interpreting the document description 110.

In the print rendering system 120, a PDL interpreter 140 interprets commands such as 111 in the document description 110. The PDL interpreter 140 produces z-ordered drawing instructions such as 112 (also referred to as object descriptions 1620), which are subsequently processed by a Display List builder 150. An interface 113 between the PDL interpreter 140 and the Display List builder 150 is a drawing Application Programming Interface (API) that allows the drawing instructions 112 to be passed from the PDL interpreter 140 to the Display List builder 150.

A simple drawing API can, for example, comprise three functions such as: drawingBegin, drawObject and drawing Finish. In such an arrangement, parameters passed by the drawObject function describe objects being drawn, such as images, text and line art in z-order. The Display List builder 150 converts the z-ordered sequence 112 of object descriptions from the PDL interpreter 140 into a y-ordered sequence of drawing instruction structures (also referred to as objects 1630) and incorporates these into a Display List (DL) 1640. A Renderer 160 processes this DL 1640 into the rendered document 170. Together the PDL interpreter 140 and the Display List builder 150 form a module 130, described hereinafter in more detail with reference to FIG. 2.

The PDL interpreter 140 and the Display List builder 150 may be implemented together on the same thread, described hereinafter in more detail with reference to FIG. 2 which depicts an example of a single thread of a first stage. Alternately, the PDL interpreter 140 and the Display List builder 150 may be implemented separately on two distinct threads, described hereinafter in more detail with reference to FIGS. 4 and 5 which depict an example of a two thread first stage.

Figure 15A:
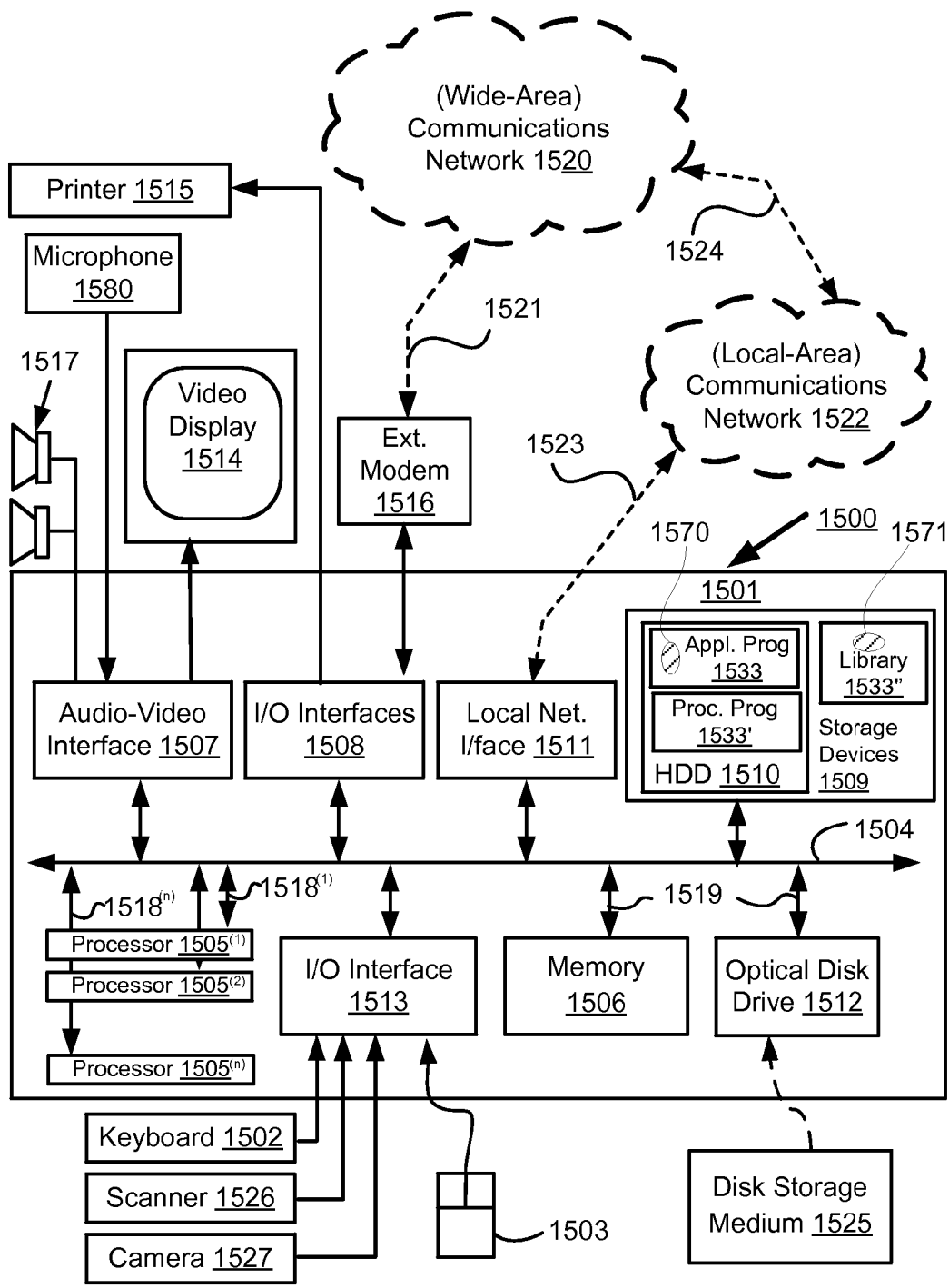
FIGS. 15A and 15B form a schematic block diagram of a general purpose computer system upon which arrangements described can be practiced.
Figure 15B:
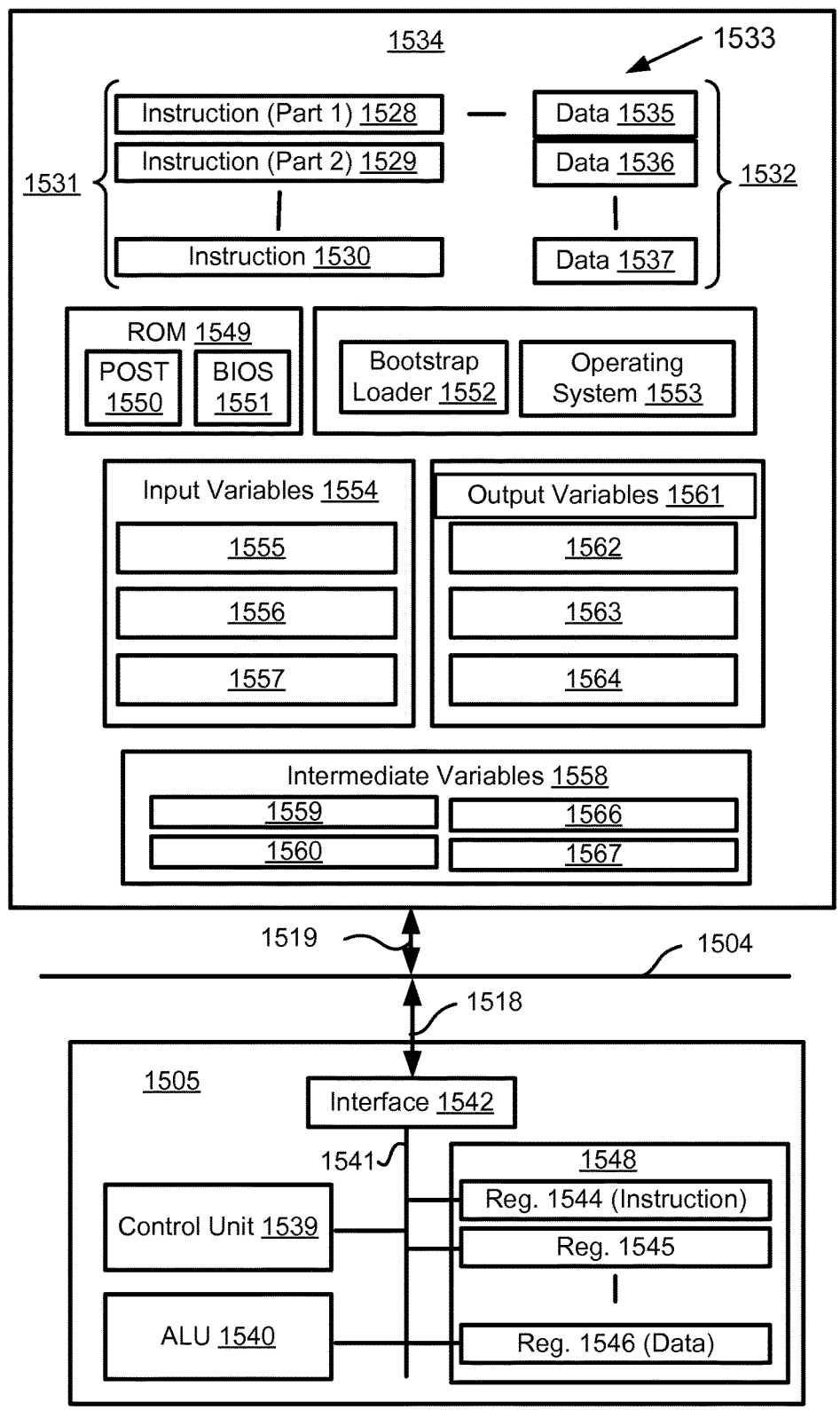

FIGS. 15A and 15B depict a general-purpose multi-core computer system 1500, upon which the various ASMT arrangements described can be practiced.

As seen in FIG. 15A, the computer system 1500 includes: a computer module 1501; input devices such as a keyboard 1502, a mouse pointer device 1503, a scanner 1526, a camera 1527, and a microphone 1580; and output devices including a printer 1515, a display device 1514 and loudspeakers 1517. An external Modulator-Demodulator (Modem) transceiver device 1516 may be used by the computer module 1501 for communicating to and from a communications network 1520 via a connection 1521. The communications network 1520 may be a wide-area network (WAN), such as the Internet, a cellular telecommunications network, or a private WAN. Where the connection 1521 is a telephone line, the modem 1516 may be a traditional "dial-up" modem. Alternatively, where the connection 1521 is a high capacity (e.g., cable) connection, the modem 1516 may be a broadband modem. A wireless modem may also be used for wireless connection to the communications network 1520.

The computer module 1501 typically includes a plurality processors 1505(1), 1505(2), . . . , 1505(n) (ie cores) for executing an application software program 1533 (such as a the print rendering arrangement of FIG. 1) scheduled by an operating system scheduler 1533', and a memory unit 1506. The operating system scheduler 1533' may form part of an operating system 1553, described hereinafter in more detail with reference to FIG. 15B. For example, the memory unit 1506 may have semiconductor random access memory (RAM) and semiconductor read only memory (ROM). The computer module 1501 also includes an number of input/output (I/O) interfaces including: an audio-video interface 1507 that couples to the video display 1514, loudspeakers 1517 and microphone 1580; an I/O interface 1513 that couples to the keyboard 1502, mouse 1503, scanner 1526, camera 1527 and optionally a joystick or other human interface device (not illustrated); and an interface 1508 for the external modem 1516 and printer 1515. In some implementations, the modem 1516 may be incorporated within the computer module 1501, for example within the interface 1508. The computer module 1501 also has a local network interface 1511, which permits coupling of the computer system 1500 via a connection 1523 to a local-area communications network 1522, known as a Local Area Network (LAN). As illustrated in FIG. 15A, the local communications network 1522 may also couple to the wide network 1520 via a connection 1524, which would typically include a so-called "firewall" device or device of similar functionality. The local network interface 1511 may comprise an Ethernet circuit card, a Bluetooth® wireless arrangement or an IEEE 802.11 wireless arrangement; however, numerous other types of interfaces may be practiced for the interface 1511.

The I/O interfaces 1508 and 1513 may afford either or both of serial and parallel connectivity, the former typically being implemented according to the Universal Serial Bus (USB) standards and having corresponding USB connectors (not illustrated). Storage devices 1509 are provided and typically include a hard disk drive (HDD) 1510. Other storage devices such as a floppy disk drive and a magnetic tape drive (not illustrated) may also be used. An optical disk drive 1512 is typically provided to act as a non-volatile source of data. Portable memory devices, such optical disks (e.g., CD-ROM, DVD, Blu-Ray Disc™), USB-RAM, portable, external hard drives, and floppy disks, for example, may be used as appropriate sources of data to the system 1500.

The components 1505 to 1513 of the computer module 1501 typically communicate via an interconnected bus 1504 and in a manner that results in a conventional mode of operation of the computer system 1500 known to those in the relevant art. For example, the processors 1505(1), . . . , 1505(n) are coupled to the system bus 1504 using respective connections 1518(1) . . . 1518(n). Likewise, the memory 1506 and optical disk drive 1512 are coupled to the system bus 1504 by connections 1519. Examples of computers on which the described arrangements can be practised include IBM-PC's and compatibles, Sun Sparcstations, Apple Mac™ or a like computer systems.

The ASMT method may be implemented using the computer system 1500 wherein the processes of FIGS. 5 and 7-11, to be described, may be implemented as ASMT code (also referred to as parallel-serial code 1570) embedded as part of said one or more software application programs 1533 executable within the computer system 1500. The scheduling of tasks performed in the aforementioned processes of FIGS. 5 and 7-11 onto the cores 1505(1), . . . , 1505(n) may be implemented using said operating system scheduler 1533' executable within the computer system 1500.

In particular, in one ASMT arrangement referred to as an "embedded ASMT arrangement", the steps of the ASMT method are effected by instructions 1531 in the ASMT parallel-serial code 1570 that are incorporated (embedded) into the software 1533. These steps are carried out within the computer system 1500. In this implementation, the ASMT arrangement software code is incorporated directly into the application software program 1533 and is present in the software 1533 when it is acquired by a user. Thus for example according to this arrangement, a user can either purchase a "standard" version of a print rendering program 1533 or a ASMT version of the print rendering program 1533, only the latter being configured to perform the ASMT methods. In another ASMT arrangement, the ASMT arrangement parallel-serial code 1571 can reside in a library 1533", and an application software program, written specifically to support an ASMT library, makes use of a library API to perform the ASMT methods. Upon installing or running the multi-threaded print rendering program that is written specifically to support the ASMT library, the ASMT arrangement software code in the library can be linked to the multi-threaded print rendering program, thus converting the multi-threaded print rendering program that is written specifically to support the ASMT library, which cannot without the library perform the ASMT methods, to a "library based" ASMT version of the print rendering program, which is configured to perform the ASMT methods.

The software instructions 1531 may be formed as one or more code modules, each for performing one or more particular tasks. The software may also be divided into two separate parts, in which a first part and the corresponding code modules performs the ASMT methods and a second part and the corresponding code modules manage a user interface between the first part and the user.

The software may be stored in a computer readable medium, including the storage devices described below, for example. The software is loaded into the computer system 1500 from the computer readable medium, and then executed by the computer system 1500. A computer readable medium having such software or computer program recorded on the computer readable medium is a computer program product. The use of the computer program product in the computer system 1500 preferably effects an advantageous ASMT apparatus.

The software 1533, 1533' and 1533" is typically stored in the HDD 1510 or the memory 1506. The software is loaded into the computer system 1500 from a computer readable medium, and executed by the computer system 1500. Thus, for example, the software 1533, 1533' and 1533" may be stored on an optically readable disk storage medium (e.g., CD-ROM) 1525 that is read by the optical disk drive 1512. A computer readable medium having such software or computer program recorded on it is a computer program product. The use of the computer program product in the computer system 1500 preferably effects a ASMT apparatus.

In some instances, the application programs 1533 and 1533" may be supplied to the user encoded on one or more CD-ROMs 1525 and read via the corresponding drive 1512, or alternatively may be read by the user from the networks 1520 or 1522. Still further, the software can also be loaded into the computer system 1500 from other computer readable media. Computer readable storage media refers to any non-transitory tangible storage medium that provides recorded instructions and/or data to the computer system 1500 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 1501. Examples of transitory or non-tangible computer readable transmission media that may also participate in the provision of software, application programs, instructions and/or data to the computer module 1501 include radio or infra-red transmission channels as well as a network connection to another computer or networked device, and the Internet or Intranets including e-mail transmissions and information recorded on Websites and the like.

The second part of the application programs 1533 and 1533' and the corresponding code modules mentioned above may be executed to implement one or more graphical user interfaces (GUIs) to be rendered or otherwise represented upon the display 1514. Through manipulation of typically the keyboard 1502 and the mouse 1503, a user of the computer system 1500 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1517 and user voice commands input via the microphone 1580.

FIG. 15B is a detailed schematic block diagram of the processor 1505 and a "memory" 1534. The memory 1534 represents a logical aggregation of all the memory modules (including the HDD 1509 and semiconductor memory 1506) that can be accessed by the computer module 1501 in FIG. 15A.

When the computer module 1501 is initially powered up, a power-on self-test (POST) program 1550 executes. The POST program 1550 is typically stored in a ROM 1549 of the semiconductor memory 1506 of FIG. 15A. A hardware device such as the ROM 1549 storing software is sometimes referred to as firmware. The POST program 1550 examines hardware within the computer module 1501 to ensure proper functioning and typically checks the processors 1505(1), ..., 1505(n), the memory 1534 (1509, 1506), and a basic input-output systems software (BIOS) module 1551, also typically stored in the ROM 1549, for correct operation. Once the POST program 1550 has run successfully, the BIOS 1551 activates the hard disk drive 1510 of FIG. 15A. Activation of the hard disk drive 1510 causes a bootstrap loader program 1552 that is resident on the hard disk drive 1510 to execute via the processor 1505. This loads an operating system 1553 into the RAM memory 1506, upon which the operating system 1553 commences operation. The operating system 1553 is a system level application, executable by the processor 1505, to fulfil various high level functions, including processor management, memory management, device management, storage management, software application interface, and generic user interface.

The operating system 1553 manages the memory 1534 (1509, 1506) to ensure that each process or application running on the computer module 1501 has sufficient memory in which to execute without colliding with memory allocated to another process. Furthermore, the different types of memory available in the system 1500 of FIG. 15A must be used properly so that each process can run effectively. Accordingly, the aggregated memory 1534 is not intended to illustrate how particular segments of memory are allocated (unless otherwise stated), but rather to provide a general view of the memory accessible by the computer system 1500 and how such is used.

As shown in FIG. 15B, the processor 1505 includes a number of functional modules including a control unit 1539, an arithmetic logic unit (ALU) 1540, and a local or internal memory 1548, sometimes called a cache memory. The cache memory 1548 typically include a number of storage registers 1544-1546 in a register section. One or more internal busses 1541 functionally interconnect these functional modules. The processor 1505 typically also has one or more interfaces 1542 for communicating with external devices via the system bus 1504, using a connection 1518. The memory 1534 is coupled to the bus 1504 using a connection 1519.

The application program 1533 includes a sequence of instructions 1531 that may include conditional branch and loop instructions. The program 1533 may also include data 1532 which is used in execution of the program 1533. The instructions 1531 and the data 1532 are stored in memory locations 1528, 1529, 1530 and 1535, 1536, 1537, respectively. Depending upon the relative size of the instructions 1531 and the memory locations 1528-1530, a particular instruction may be stored in a single memory location as depicted by the instruction shown in the memory location 1530. Alternately, an instruction may be segmented into a number of parts each of which is stored in a separate memory location, as depicted by the instruction segments shown in the memory locations 1528 and 1529.

In general, the processor 1505 is given a set of instructions which are executed therein. The processor 1105 waits for a subsequent input, to which the processor 1505 reacts to by executing another set of instructions. Each input may be provided from one or more of a number of sources, including data generated by one or more of the input devices 1502, 1503, data received from an external source across one of the networks 1520, 1502, data retrieved from one of the storage devices 1506, 1509 or data retrieved from a storage medium 1525 inserted into the corresponding reader 1512, all depicted in FIG. 15A. The execution of a set of the instructions may in some cases result in output of data. Execution may also involve storing data or variables to the memory 1534.

The disclosed ASMT arrangements use input variables 1554, which are stored in the memory 1534 in corresponding memory locations 1555, 1556, 1557. The ASMT arrangements produce output variables 1561, which are stored in the memory 1534 in corresponding memory locations 1562, 1563, 1564. Intermediate variables 1558 may be stored in memory locations 1559, 1560, 1566 and 1567.

Referring to the processor 1505 of FIG. 15B, the registers 1544, 1545, 1546, the arithmetic logic unit (ALU) 1540, and the control unit 1539 work together to perform sequences of micro-operations needed to perform "fetch, decode, and execute" cycles for every instruction in the instruction set making up the program 1533. Each fetch, decode, and execute cycle comprises:

a fetch operation, which fetches or reads an instruction 1531 from a memory location 1528, 1529, 1530;
a decode operation in which the control unit 1539 determines which instruction has been fetched; and
an execute operation in which the control unit 1539 and/or the ALU 1540 execute the instruction.

Thereafter, a further fetch, decode, and execute cycle for the next instruction may be executed. Similarly, a store cycle may be performed by which the control unit 1539 stores or writes a value to a memory location 1532.

Each step or sub-process in the processes of FIGS. 2, 4-5, and 7-11, is associated with one or more segments of the program 1533 and is performed by the register section 1544, 1545, 1547, the ALU 1540, and the control unit 1539 in the processor 1505 working together to perform the fetch, decode, and execute cycles for every instruction in the instruction set for the noted segments of the program 1533.

The ASMT method may alternatively be implemented in dedicated hardware such as one or more integrated circuits performing the ASMT functions or sub functions. Such dedicated hardware may include graphic processors, digital signal processors, or one or more microprocessors and associated memories.

Figure 2:
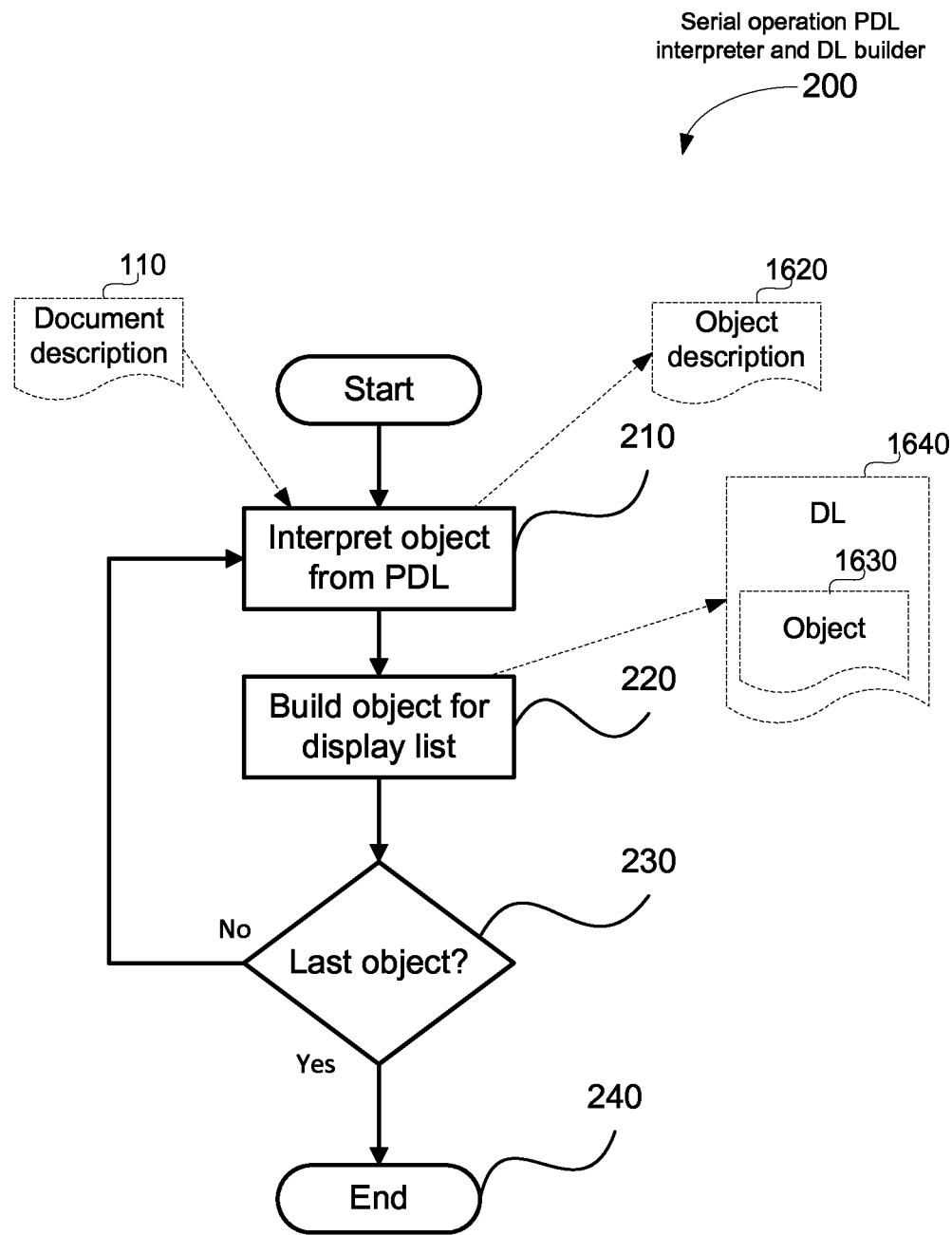
FIG. 2 is a schematic flow diagram illustrating a method of interpreting a document described by a page description language (PDL) and building a display list (DL) utilising a single thread.

FIG. 2 is a schematic flow diagram illustrating an example of a processing method 200 that can be used for implementing the module 130 of the print rendering system 120 using, for example, the general purpose computer system depicted in FIGS. 15A and 15B. The method 200 builds the Display List (DL) 1640 from the document description 110, using a single thread of execution executing on a single core. In an entry step 210, performed by the processor 1505[(1)] executing the software application program 1533, the PDL interpreter 140 interprets the document description 110 and extracts an object description 1620. The display list builder 150 then builds, in a step 220, performed by the processor 1505[(1)] executing the software application program 1533, an object 1630 for the DL 1640 by creating data structures and converting data from the object description 1620 into a y-ordered list of drawing instructions for storing in the Display List 1640. The step 220 then adds the object 1630 to the display list 1640. The object descriptions 1620 may include path co-ordinates, a transform to convert to an output space, fill type, and object attributes such as winding rule. A test step 230, performed by the processor 1505[(1)] executing the software application program 1533, then determines if the object 1630 is the last object in the document description 110 to be processed. If this is not the case, the process 200 follows a NO arrow back to the step 210. Otherwise, the process 200 follows a YES arrow to a step 240 and processing of the document ends.

Figure 3:
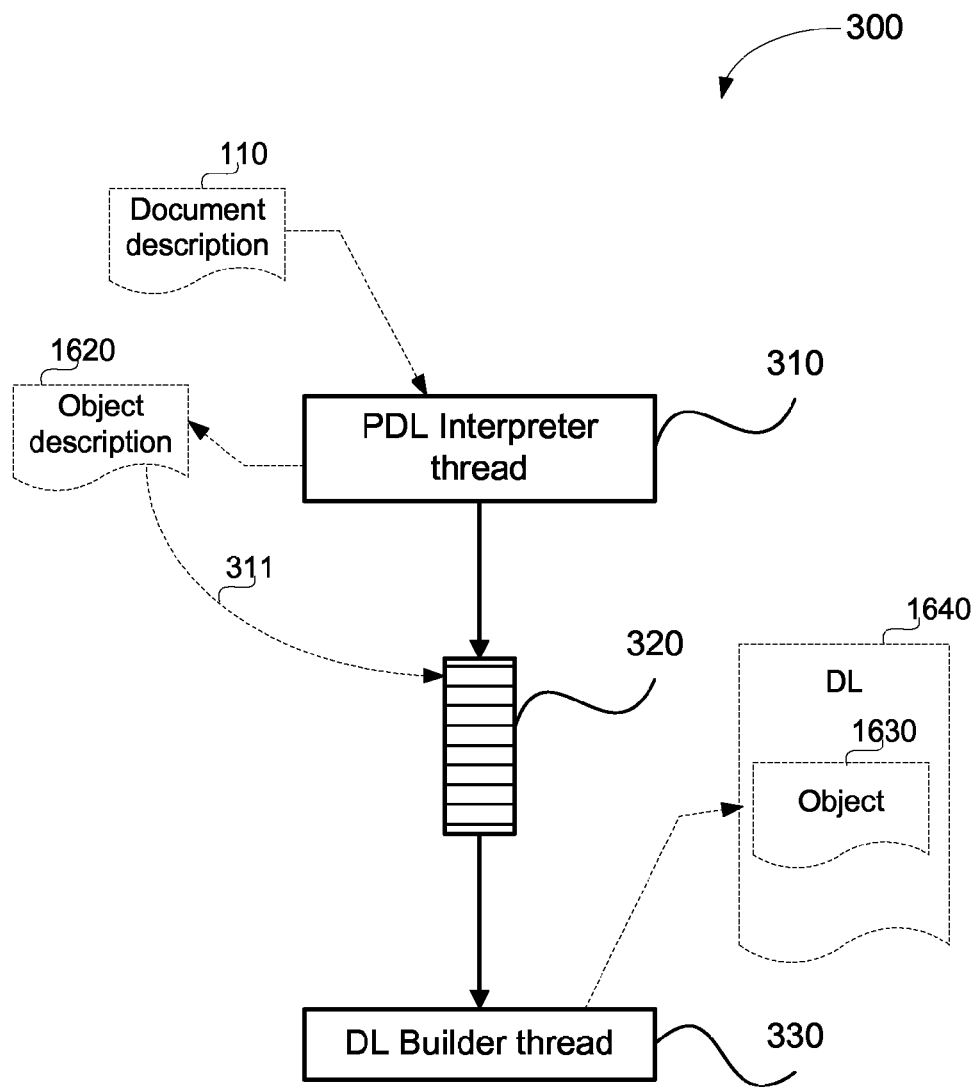
FIG. 3 is a schematic block diagram of a PDL interpreter thread and a DL builder thread communicating via a queue, in which ASMT arrangements may be practised.

FIG. 3 is a schematic block diagram illustrating building of a DL such as 1640 from a document description such as 110, utilising two threads of execution that communicate via a message queue 320. The message queue 320 can be implemented as part of the memory 1506. This arrangement allows a PDL interpreter thread 310 (which is a producer thread in this example) and a DL builder thread 330 (which is a consumer thread in this example) to operate concurrently in the multiprocessor (ie a multi-core) system 1500 using, for example, the respective processor cores $1505^{(1)}$ and $1505^{(2)}$. The first thread 310 implements, performed by the core $1505^{(1)}$, a PDL interpreter such as 140 that interprets the document description 110 into object descriptions such as 1620 and places the object descriptions 1620 (the object descriptions 1620 also being referred to generically as "messages" into the message queue 320 as depicted by a dashed line 311. The second thread 330 implements, performed by the core $1505^{(2)}$, the DL builder 150 which builds the DL 1640. The thread 330 receives, performed by the core $1505^{(2)}$, the object descriptions 1620 from the message queue 320. The thread 330 creates, performed by the core $1505^{(2)}$, data structures and converts data from the received object description 1620 into objects such as 1630 which are in a suitable form for incorporation in the DL 1640.

Message queues such as 320 are constructed with synchronisation mechanisms such as mutexes and semaphores that allow the message queue reader (330 in this example) and writer (310 in this example) to wait (or "block") under certain conditions. The PDL interpreter thread 310 can freely write, performed by the core $1505^{(1)}$, to the message queue 320 until the queue 320 is full, at which point the Operating System 1553 will put the PDL Interpreter 310 thread to sleep. Similarly, the DL builder 330, performed by the core $1505^{(2)}$, can freely read from message queue 320 until the queue is empty, at which point the Operating System 1553 will put the DL builder 330 to sleep.

When the threads sleep, the Operating System 1553 schedules other threads (not shown) for operation on the cores $1505^{(1)}$ and $1505^{(2)}$, and monitors the state of the synchronisation mechanisms used to construct the message queue 320 in order to determine whether one of the sleeping threads 310, 320 should be woken. A typical criterion for waking a thread (also referred to as "unblocking the thread") is that it is possible for the thread to consume or produce a single message. However, in situations where the work done by the producer or the consumer thread per message processed is small, it is advantageous to wait until the occupancy state of the message queue, which may be defined as either the number of messages in the message queue 320, or alternately a function of this number of messages, has reached a predetermined threshold to allow the woken consumer thread to process multiple messages. The threshold is set to reduce the overhead of putting the threads to sleep and waking the threads too frequently.

Figure 4:
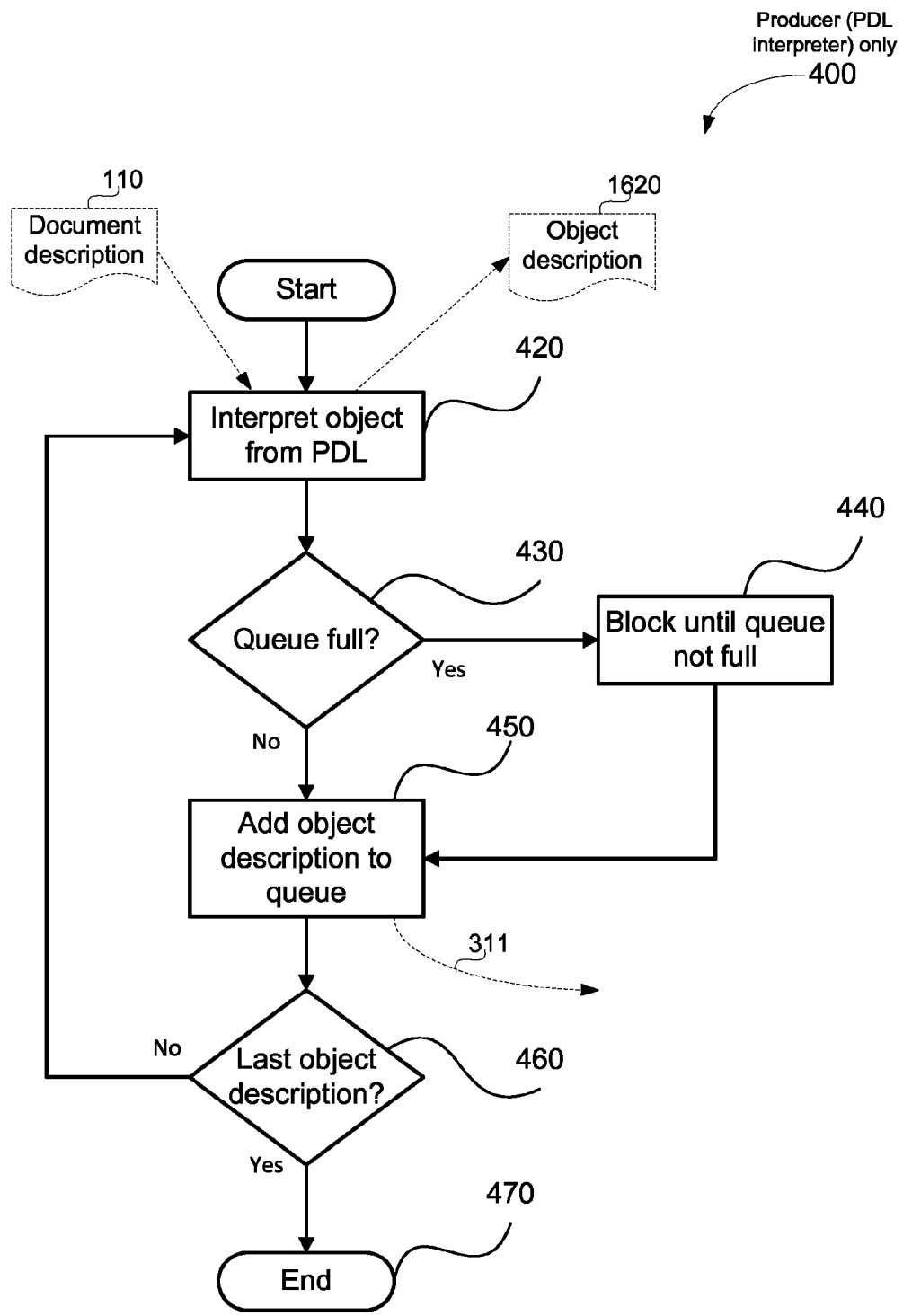
FIG. 4 is a schematic flow diagram illustrating a method of interpreting a document described by a page description language (PDL) into object definitions to be placed in a queue.
Figure 5:
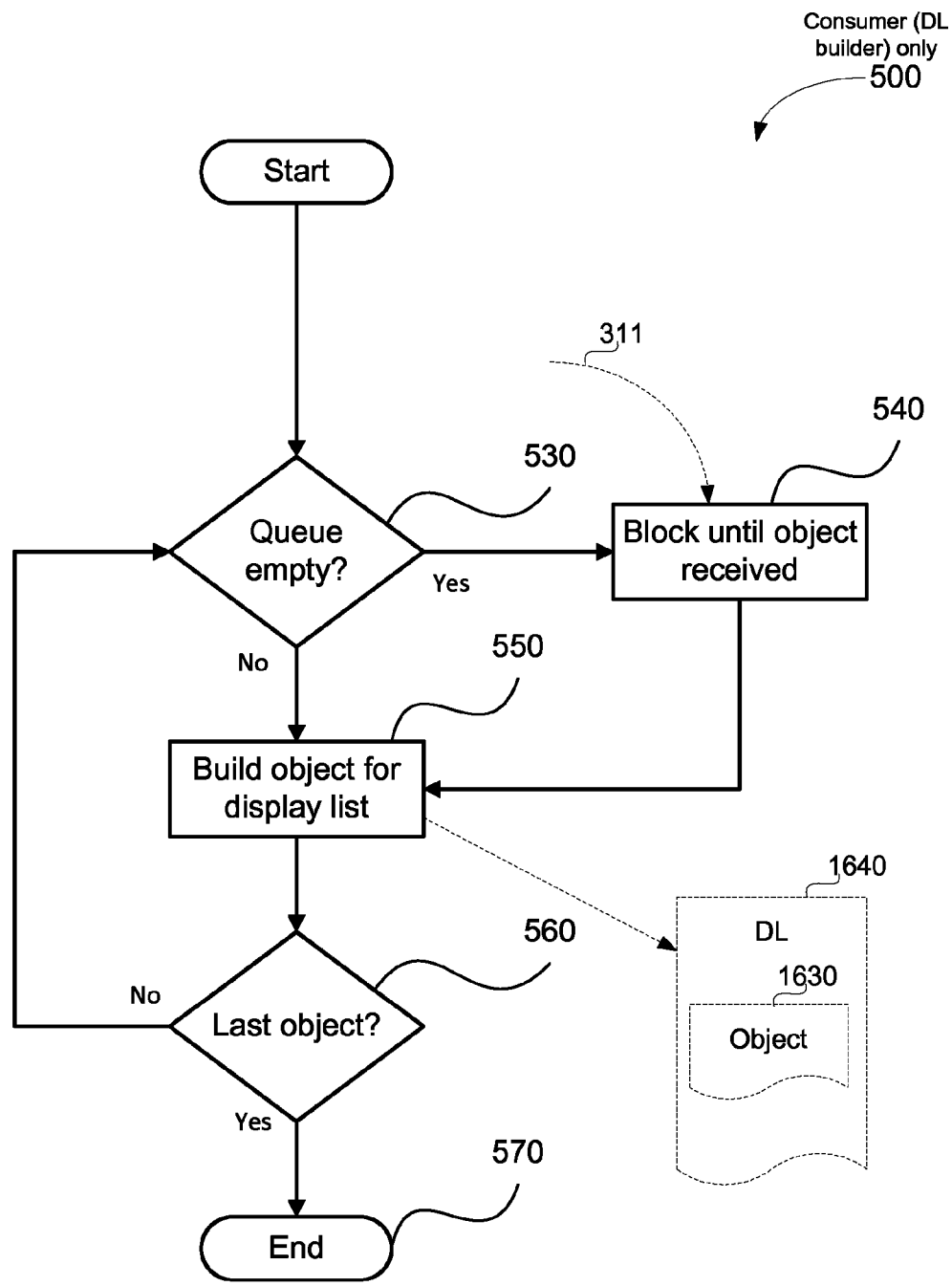
FIG. 5 is a schematic flow diagram illustrating a method of receiving object definitions from a queue and building a display list, in which ASMT arrangements may be practised.
Figure 6A:
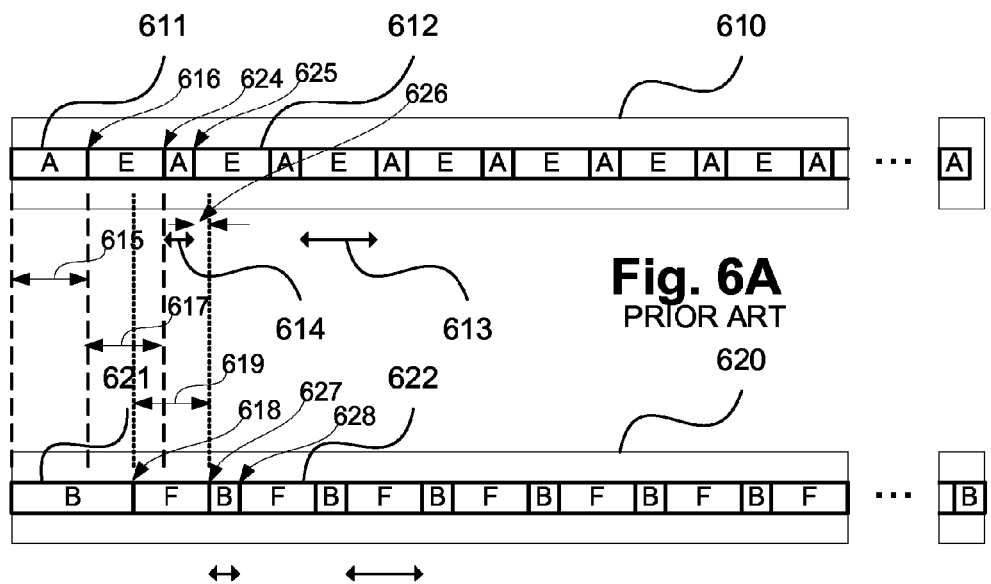
FIGS. 6A-6D depict an example of a timing diagram showing the execution schedule of tasks on an operating system when not using ASMT arrangements.
Figure 6B:
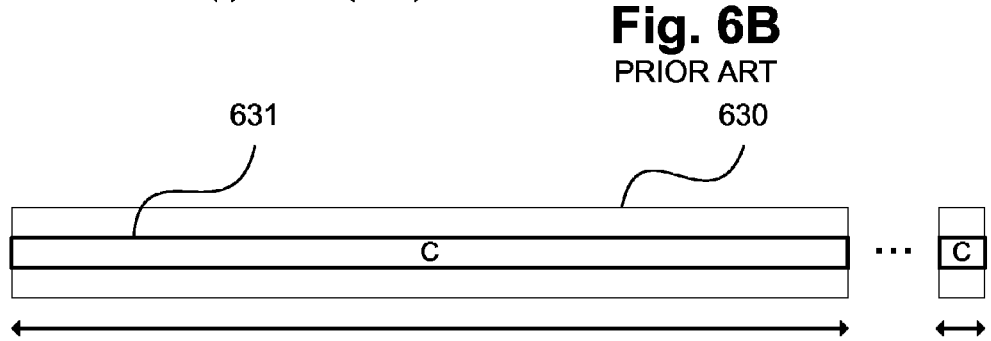
Figure 6C:
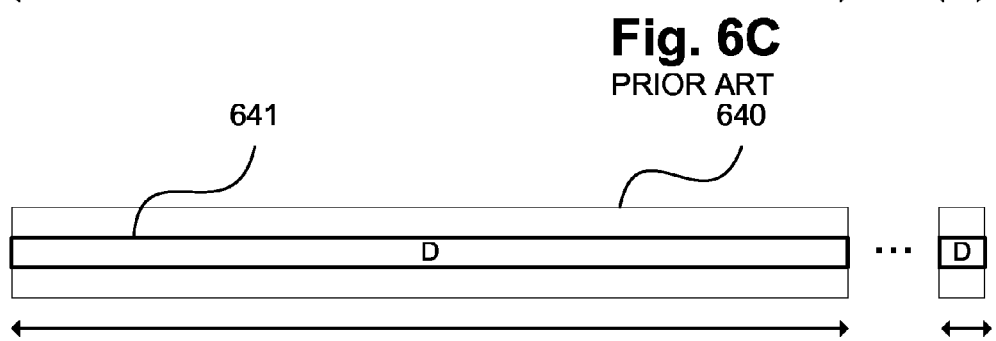
Figure 6D:

FIGS. 4 and 5 are schematic flow diagrams illustrating alternate implementations of the process 200 in FIG. 2, where the PDL interpreter thread 310 and the Display List builder thread 330 run in parallel on separate cores $1505^{(1)}$ and $1505^{(2)}$ using a producer-consumer pattern. In the examples depicted in FIGS. 4 and 5, building the DL 1640 from the document description 110 is performed using one thread of execution 400 for the PDL interpreting stage 140, performed by the core $1505^{(1)}$, which communicates via the message queue 320, with another separate thread of execution 500 for the DL builder stage 150 which uses the core $1505^{(2)}$.

FIG. 4 is a schematic flow diagram illustrating an example of a processing method 400 used by a document interpreter thread such as 310, performed by the core $1505^{(1)}$. In an entry step 420, performed by the core $1505^{(1)}$, the interpreting thread 310 starts by interpreting a first object description 1620 from the document description 110. A test step 430, performed by the core $1505^{(1)}$, then determines if the message queue 320 for receiving the object descriptions is full. The message queue is determined to be full if there is no space in the queue to add a predetermined number of messages. It may be that multiple messages are required to fully define an object, the predetermined number could be the maximum number of messages needed to define an object.

The queue 320 can be implemented in the memory 1506 with a circular buffer and atomic CPU intrinsic operations (CAS) on the number of messages in the queue, where a write and a read index into the circular buffer is used by the PDL interpreter or DL builder respectively. The queue is deemed to be full when the queue content (the number of messages in queue) approached an allocated size.

This can be done, in one example, by maintaining two pointers to entries in a fixed sized implementation of the queue 320. The first pointer points to the start of the queue (known as the "head"), and the second pointer points to the last element (known as the "tail"). When the head and tail pointers point to the same queue entry, the queue is empty. As the queue fills up, the head pointer advances to mark the next free spot in the queue. When the head advances such that it is adjacent to the tail pointer, the queue is full. Comparing the head and tail pointers allow the queue occupancy state to be determined.

Alternate implementations of the message queue can be used in the ASMT arrangements. Thus in one example the maximum number of messages able to be stored in the queue is constrained by either the number of fixed-sized messages that the queue is configured to contain, or the maximum size (in bytes) that can be occupied by variable length messages. Typically the size of the queue is determined based on the expected normal operation of the producer and consumer. Limiting the maximum size of the queue is important to ensure that memory use does not impact on the rest of the system.

Returning to the step 430, if the queue 320 is full the process 400 follows a YES arrow to a step 440, performed by the core $1505^{(1)}$, which directs the PDL interpreter thread 310 to block (ie to sleep, or to become inoperative) thereby placing the producer thread into an idle state, until the queue 320 is no longer full. Blocking involves sending a system call, or signalling, by an application thread (i.e. producer PDL interpreter thread 310) in this case) to an operating system 1533, 1533'. This system call specifies under what condition to unblock (ie wake up, or become active) the application thread, i.e. to place the application thread into an active state. The thread will not be scheduled by the operating system until this condition is met.

In the ASMT arrangement, the producer thread 310 signals to the operating system, e.g. by sending the system call, when the message queue 320 is full, so that the producer thread 310 is now placed into an idle state. The operating system monitors the semaphore associated with the message queue so that when the semaphore becomes positive the operating system is again able to schedule the producer thread when scheduling allows (the producer thread is unblocked). The semaphore is incremented by the consumer thread 330 when the message queue is no longer full, for example when the consumer thread processes a message from the message queue. Incrementing the semaphore is a system call by the consumer thread to the operating system. In an alternative embodiment, the semaphore can be incremented by the consumer thread only when a message is consumed when the producer thread has blocked. This is achieved by using an atomic flag by the producer thread to request that the consumer thread issues a semaphore increment (system call) to the operating system to wake the producer thread. The consumer thread clears the atomic flag before incrementing the semaphore, i.e. the producer thread is placed into an active state once the signal from the consumer thread clearing the atomic flag is received. This reduces the frequency of system calls required. There are alternate methods to achieve the reduction in frequency of system calls. In an active state, the producer thread can be scheduled by the operating system for execution when scheduling allows.

Once or if the queue 320 is not full, the process 400 is directed to a step 450, performed by the core $1505^{(1)}$, in which the PDL interpreter thread 310 adds the object description 1620 to the message queue 320, as depicted by the dashed arrow 311, to be later processed by the DL builder thread 330. A subsequent test step 460, performed by the core $1505^{(1)}$, then determines if the object description 1620 is the last object description to be interpreted. If this is not the case, the processing follows a NO arrow back to the interpreting step 420. Otherwise, the process follows a YES arrow and the interpreting of the document ends at a step 470.

FIG. 5 is a schematic flow diagram illustrating an example of a processing method 500 that can be used by a DL builder thread such as 330. The DL builder thread 330 begins with a step 530, performed by the core $1505^{(2)}$, which determines if the object description queue 320 is empty. If the queue 320 is empty the process 500 follows a YES arrow to a step 540, performed by the core $1505^{(2)}$, which blocks the thread 330 until an object description is received in the queue 320, as depicted by the dashed arrow 311. When the object description is received in the queue 320, the process 500 is directed from the step 540 to a step 550. Returning to the step 530, if the queue 320 is not empty, the process 500 follows a NO arrow to the step 550. In the step 550, the DL builder thread 330 builds, performed by the core $1505^{(2)}$, the object 1630 by creating data structures and converting data from the object description into the Display List format, and incorporates the object 1630 into the DL 1640.

Typically the format of the display list DL (1640) is a low-level representation of the drawn object 1630 specified in page coordinate space and designated render colour space (for example sRGB). A typical feature of the conversion process performed by the step 550 is the conversion of the list of z-ordered drawn objects 112 to a Display List comprising the y-ordered list 1640 of primitives to be rendered. The aforementioned conversion process typically involves transforming the object 1630 to the page coordinate space by applying a current drawing transform and converting the colour of the object 1630 to the specified render colour space. Additional steps may include reducing the shape of the object 1630 to a sequence of monotonic edges, using image compression to conserve memory consumed by the display list. The process 500 is then directed to a step 560, performed by the core $1505^{(2)}$, which determines if the object 1630 is the last object to be built. If this is not the case, the process 500 follows a NO arrow back to the step 530 to process the next object. Otherwise, the process 500 follows a YES arrow to a step 570 which terminates building of the DL.

FIGS. 6A-6D depict a timing diagram illustrating a prior art scenario characterised by a performance problem in which the PDL interpreter thread 310 and DL builder thread 330 do not run concurrently when there is high demand for processing on the computing system. When there are insufficient processors (ie cores) for all tasks to run concurrently, the Operating System divides the available processor time between the tasks according a scheduling policy. The scheduling policy is typically defined to satisfy a particular objective, such as (a) ensuring that all tasks are allocated a fair share of processing time (eg. by using a round robin policy that ensures that short tasks are run more frequently using rate monotonic scheduling), or (b) ensuring that a power budget is not exceeded, in order to maximise battery life.

One technique for sharing processor time between tasks is "time slicing", where tasks are allowed to run for a maximum amount of time before the Operating System puts the task to sleep and schedules another task to execute on the processor. Time slices are determined by the Operating System, and are typically in the order of 10 ms. As the number active tasks increases each task spends less time executing on a processor.

In FIGS. 6A-6D four processors 610, 620, 630 and 640 are running four tasks A 611, B 621, C 631 and D 641 respectively. Tasks A and B (each possibly being a portion of a larger task) run concurrently at first during a time period 615, working in a producer-consumer pattern and communicating via a message queue. A 5th Task E 612 is scheduled at a time 616. At this point the system becomes overscheduled. That is, insufficient processing time is available to execute 5 tasks A, B, C, D and E concurrently. In order to allow task E to execute, the Operating System interrupts Task A at the time 616 and executes Task E on the first processor 610 during the period 617. At the point 616 Task B can continue processing messages in the message queue 320, but no additional messages are produced because Task A is no longer executing during the period 617. Task B finishes processing a message in the queue on the second processor 620 at a time 618. A Task F 622 runs on the second processor 620 during a period 619.

The Task E runs for the period 617 (which is equal to a maximum time slice 613). The Task A resumes processing on the first processor at the time 624. However the Task A can only run for a period 614 which is the time taken to fill the queue 320, because during the period 614 the Task B is not running and thus not taking any messages from the queue 320. Accordingly, the Task A is unable to execute for the maximum time slice 613. Once the queue 320 is full at the time 625, the Operating System puts the Task A to sleep for a period 626 until Task B consumes a message item from the queue at a time 627. The task A will continue to sleep even though it may be able to wake at time 627 but task E is still running in its time slice. Accordingly, the Task A will continue to sleep for a period until it is able to be scheduled to run.

Task F runs for the period 619 which is equal to the maximum time slice. The Task B resumes processing at the time 627, but can only run until a time 628 which is as long as it takes to process the messages in the queue 320.

As with Task A, Task B is unable to execute for the full time slice. When the queue shared between Tasks A and B is small, this results in Task A and Task B running less frequently than had they been able to occupy their entire time slice. Additionally the Tasks A and B no longer run concurrently (eg see the period 614+626), thus negating the benefit of running the tasks in separate threads. Switching between tasks incurs a processing overhead associated with changing the processor's task context. The processor's task context stores the details of the task so that execution can be resumed from the same point at a later time, such details can include the contents of the general purpose registers, stack pointer and program counter. This overhead is small compared to the Operating System's maximum time slice, however in the example depicted in FIGS. 6A-6D, the Task A and the Task B are unable to execute a full time slice due to their dependency on each other through the message queue.

Excessive switching between Task A and Task B increases the time spent changing the Task context, further degrading performance. The undesired switching between Tasks A and B can be reduced by increasing the size of message queue, thus reducing the likelihood of over-scheduling. However, this comes at the expense of needing to allocate more memory to the queue that would otherwise be used elsewhere in the system. Increasing the queue size provides no guarantee that the two tasks will continue to run concurrently, particularly when the system is complex and highly parallel.

Overview

The ASMT arrangements allow for switching between two modes of operation. A first (parallel) mode of execution is performed where the PDL interpreter tasks execute in one thread 310 performed by the core $1505^{(1)}$ and the DL builder tasks execute concurrently in another distinct thread 330 performed by the core $1505^{(2)}$ and thus the PDL interpreter tasks and the DL builder tasks execute concurrently in distinct threads. In a second (serial) mode of execution the PDL interpreter and DL builder tasks execute successively in the same single thread 310, performed by the core $1505^{(1)}$. The mode of operation, ie parallel or serial, is determined by examining a communication pattern between the PDL interpreter thread and the DL builder thread by analysing the behaviour of the message queue 320 via which the two threads communicate.

If the message queue 320 is full, the PDL interpreter thread 310, performed by the core $1505^{(1)}$, blocks (ie is "placed into an idle state") after trying unsuccessfully to add the next object description to message queue 320. In the meanwhile, if the DL builder thread 330 is still executing, performed by the core $1505^{(2)}$, then the DL builder thread 330 will process a message from the queue 320, creating a vacancy in the message queue 320 and causing the PDL interpreter thread 310 to waken (ie is "placed into an active state") and add an object description to a mostly full queue 320.

If however the PDL interpreter thread 310 and DL builder thread 330 are not running concurrently and the system has an over-scheduled number of active threads to execute, the PDL interpreter thread 310 will fill the queue 320, performed by the core $1505^{(1)}$, and then block, allowing another thread to execute, performed by the core $1505^{(1)}$. When the DL builder thread 330 begins to execute, performed by the core $1505^{(2)}$, the DL builder thread 330 will process all objects from the message queue 320 and then block before the PDL interpreter thread 310 can again be scheduled to execute. From the perspective of the PDL interpreter thread 310 the message queue 320 has transitioned from being full when the PDL interpreter thread 310 blocked, to being empty when the PDL interpreter thread 310 unblocked, indicating that while the PDL interpreter thread 310 was blocked, the DL builder thread 330 was able to process all objects in the message queue 320. If the PDL interpreter had been running concurrently with the DL builder thread 330, the PDL interpreter thread 310 would have been able to add more objects to the message queue 320 before the DL builder thread 330 exhausted processing all the objects.

The above situation can be considered to be one full-empty cycle count (ie one oscillation cycle). The ASMT arrangements monitor for occurrence of this oscillating cycle between the message queue 320 being full and the message queue 320 being empty. The monitoring is performed from the perspective of the PDL interpreting thread 310, performed by the core $1505^{(1)}$. Occurrence of the oscillating cycle indicates that the two threads are not running concurrently when the message queue 320 transitions from being full when blocked to being empty when unblocked. This situation is referred to as oscillation of the message queue contents. In the event of oscillation of the message queue contents being detected, the processing mode is changed from the parallel processing mode to the serial processing mode of execution with both the PDL interpreting task 140 and the DL builder task 150 running serially on the same single thread 310, performed by the core $1505^{(1)}$. Accordingly, detection of an oscillation cycle flags the occurrence of over-scheduling of the processors executing the application program 1533, and triggers a transition from the parallel mode to the serial mode of execution of the application program 1533. In one ASMT arrangement, detection of an oscillation cycle in the queue 320 sets a flag (referred to as a mode state flag) which can be detected by the ASMT code 1570 and the DL builder task running on thread 330 will then run on thread 310 along with the PDL interpreter tasks. The ASMT code does not interact directly with the operating system scheduler.

In the serial mode of operation, the thread that is executing the DL builder tasks continues to be scheduled for operation, on the core $1505^{(2)}$, if a message is added to the message queue 320. The serial PDL interpreter thread 310 now executing together with the DL builder tasks on the core $1505^{(1)}$, continues to monitor the queue 320 to determine when the second thread 330 (i.e. the old DL builder thread) is again running concurrently with the PDL interpreter thread 310. It does this by sending a test message to the old DL builder thread 330 to determine the response time. After processing another object from the PDL data, if the PDL interpreter thread detects, using the core $1505^{(1)}$, that the test message is cleared by the old DL builder thread 330, this indicates a quick response. If there are many objects interpreted between sending the test message and the test message being cleared, this indicates a slow response time. When the number of test messages being sent with a quick response time has reached a predetermined threshold (establishing that the response time of the old DL builder thread 330 is above a predetermined threshold) the message queue 320 is considered to be flowing freely, and this indicates that the two threads are running concurrently. The processing mode is then changed to the parallel mode of executing with the PDL interpreting tasks and DL building tasks executing on separate threads performed by the respective cores $1505^{(1)}$ and $1505^{(2)}$.

Accordingly, detection of free flow of the message queue 320 flags the end of the over-scheduled state of the system (establishing that the threads are operating concurrently) and the onset of the under-scheduled state of the system, and this triggers a transition from the serial mode to the parallel mode of execution of the application program 1533. In one ASMT arrangement, detection of a free flow of the message queue 320 sets a flag (i.e. the processing mode state) which can be detected by the ASMT code 1570. It is noted that the threads PDL 310 and DL 330 threads are not destroyed and recreated. When in parallel mode thread 310 has PDL tasks and thread 330 has DL tasks. When in serial mode thread 310 has PDL and DL tasks. Thread 330 does not have any tasks and only receives test messages on the queue 320. When thread 310 see that the test messages are being processes concurrently with itself, the mode is changed back to parallel mode.

Thus the ASMT arrangements allow either (a) execution of PDL interpreter tasks in parallel with DL builder tasks in two separate threads performed by respective processors $1505^{(1)}$, $1505^{(2)}$ when there are sufficient processors and the system is not over-scheduled or (b) the execution of PDL interpreter tasks in series with DL builder tasks processors performed by the single processor $1505^{(1)}$ when the system is over-scheduled.

This ASMT arrangement is performed independently of the underlying operating system 1553 and is only dependant on monitoring of the queue 320 between the two threads 310, 330. The operating system 1553 has no inherent mechanism for determining that two threads should run together concurrently on the respective distinct processors $1505^{(1)}$, $1505^{(2)}$.

In a (non-ASMT) system where full control is available over which threads are running on the system, it is possible to ensure that the two threads run concurrently on separate processors $1505^{(1)}$, $1505^{(2)}$, by careful scheduling. However, The ASMT arrangements do not rely upon the operating system 1533 knowing about all threads running on the system 1500 and the test to run concurrently or not can be performed in isolation between the two threads involved. This provides a versatile solution in a majority of instances where two tasks would benefit from execution in parallel when sufficient resources allow, but can revert to serial execution when the system becomes over-scheduled.

Embodiment 1

Figure 7:
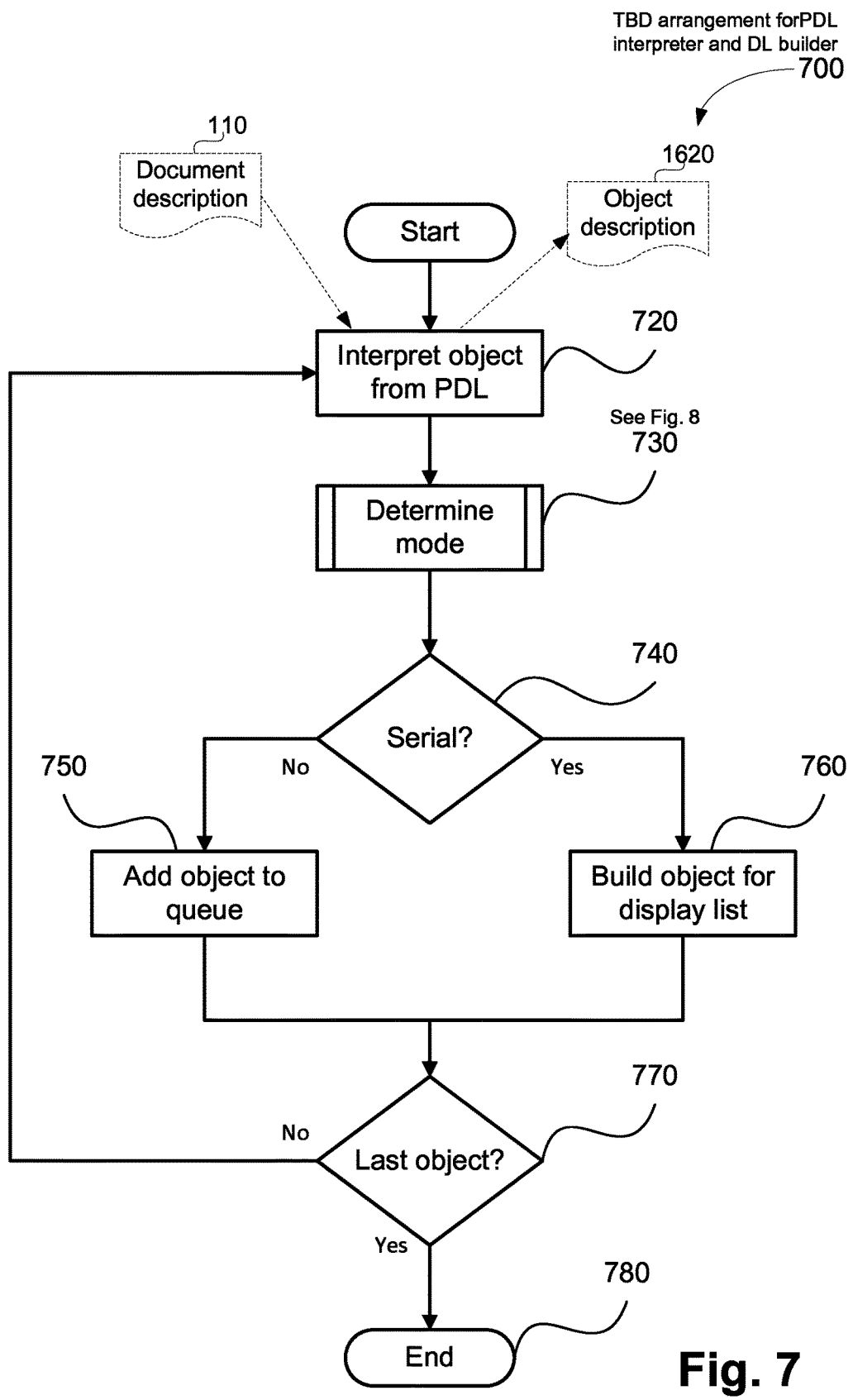
FIG. 7 is a schematic flow diagram illustrating a method of interpreting a document described by a page description language (PDL) into object definitions and determining whether to place each object definition into a queue or build each object definition into the display list, according to ASMT arrangements.

A first ASMT arrangement can be practiced on an interpreter and builder as depicted in FIG. 3. FIG. 7 depicts a thread selectively performing PDL interpreter tasks or combined PDL interpreter and DL builder tasks depending on the determined serial or parallel mode. FIG. 5 performs the DL builder tasks only in a second thread as described previously.

FIG. 7 is a schematic flow diagram illustrating an example 700 of a processing method for a thread that selectively performs either a separate (parallel mode) document interpreting stage 140 or a combined (serial mode) document interpreting 140 and DL builder stages 150. In an entry step 720, performed by processor $1505^{(1)}$, the interpreting starts by interpreting a first object definition from a document described by the PDL 110 and outputting the object description 1620. The queue 320 is then examined, performed by processor $1505^{(1)}$, in a following step 730 to determine a current mode of the process, where, the mode is either (a) serial document interpreting and display list building mode on a single thread, or (b) document interpreting in parallel with display list building mode on separate distinct threads.

The mode is then tested in a following step 740, performed by processor $1505^{(1)}$. If the step 740 determines that processing is to be performed using a serial mode, then the process 700 follows a YES arrow to a step 760 which builds, using the processor $1505^{(1)}$, an object 1630 for the display list 1640. If the step 740 determines that processing is to be performed using parallel mode, then the process 700 follows a NO arrow to a step 750 which adds, using the processor $1505^{(1)}$, the object description 1620 to the queue 320 to be later processed by a thread that performs DL builder stage 150, using the processor $1505^{(2)}$.

Thereafter, a test step 770, performed by processor $1505^{(1)}$, determines if this object was the last object to be interpreted. If it was not the last object, the processing 700 follows a NO arrow back to the interpreting step 720. Otherwise, the process 700 follows a YES arrow to a step 780 and interpreting of the document ends.

Figure 8:
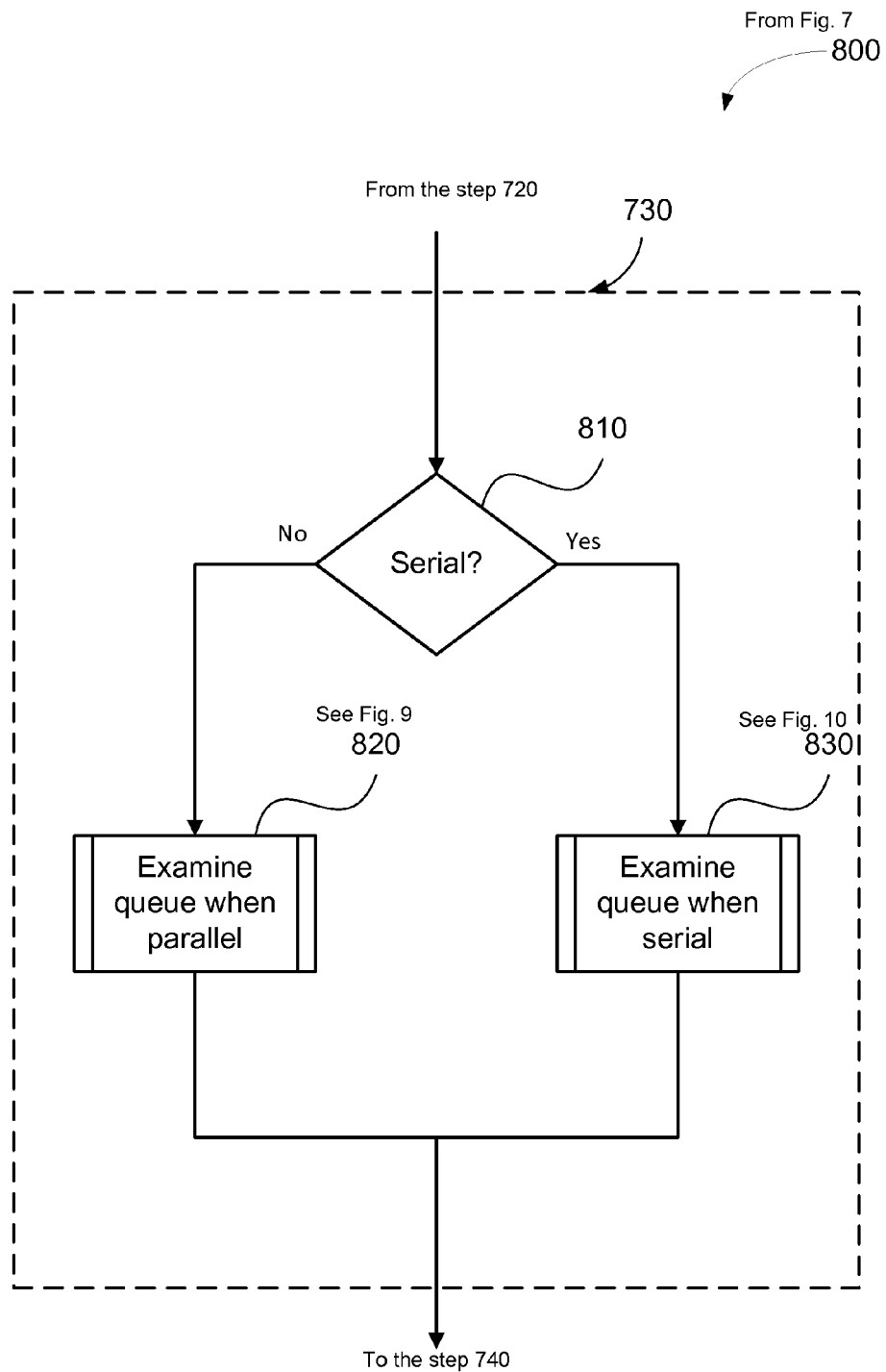
FIG. 8 is a schematic flow diagram illustrating a method of determining which mode of operation the PDL thread is in, as used in the method of FIG. 7.

FIG. 8 is a schematic flow diagram illustrating in more detail the process 730 for determining the mode of operation (ie the mode state). The mode state, ie parallel mode or serial mode, is stored in the memory 1506 and is initialised to parallel mode, reflecting the default processing mode of the ASMT arrangements. The process 730 is entered from the step 720 and commences with a test step 810, performed by the processor $1505^{(1)}$, which determines, based upon the mode state flag, whether the system is currently operating in serial or parallel mode. Depending on the current mode state, one of two paths is executed to monitor the operation of the queue. If the queue is operating in parallel mode, the process 730 follows a NO arrow and a step 820, performed by the processor $1505^{(1)}$, determines if the mode state should be changed, and if so, sets the mode state to serial mode. Alternately, when the queue is operating in serial mode, the process 730 follows a YES arrow to a step 830, performed by the processor $1505^{(1)}$, which determines if the mode state should be changed, and if so, sets the mode state to parallel mode. Conditions for switching from parallel to serial mode and from serial to parallel mode and are usually different and will be described later with references to FIGS. 9 and 10 respectively. The process 730 is then directed to the step 740.

Figure 9:
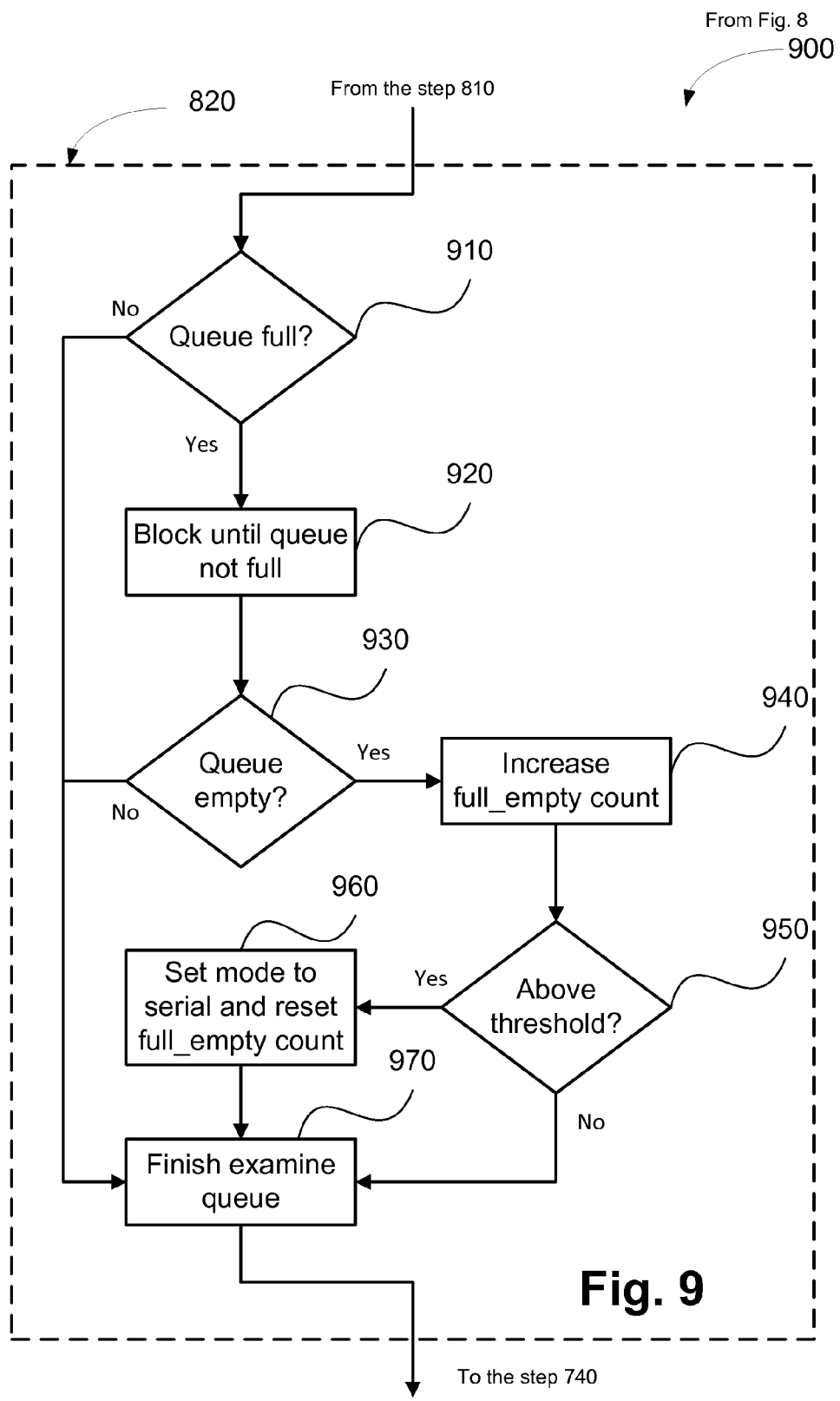
FIG. 9 is a schematic flow diagram illustrating a method of examining a queue to determine if object definitions should be processed in series or remain being processed in parallel, as used in the method of FIG. 8.

FIG. 9 is a schematic flow diagram illustrating in more detail the method step 820 (see FIG. 8) of examining the queue 320, when the PDL interpreter thread 310 and the DL builder thread 330 are executed concurrently in a parallel mode, to determine a need to switch to the serial processing mode. The process 820 enters from the step 810, and a test step 910, performed by the processor $1505^{(1)}$, determines if the queue 320 is full. If this is not the case, control follows a NO arrow to a step 970, performed by the processor $1505^{(1)}$, which finishes examining the queue 320 and the processing mode remains in a parallel mode. The process is then directed to the step 740 in FIG. 7.

Returning to the step 910, if the queue 320 is full, control follows a YES arrow to a step 920, performed by the processor $1505^{(1)}$, which blocks the thread until the queue 320 is not full. Thereafter, a second test step 930, performed by the processor $1505^{(1)}$, is performed to see if the queue 320 is empty directly after unblocking from a full queue 320. If the queue 320 is empty directly after the PDL interpreter thread 310 wakes from blocking on a full queue 320, this indicates that the DL builder thread 330 was able to process all messages in the full queue 320 while the PDL interpreter thread 310 slept. The PDL interpreter thread 310 would have been able to be scheduled to run as soon as the DL builder thread 330 processed a single message from the queue 310. Considering that the PDL interpreter thread 310 was not scheduled to add more objects to the queue 320 this indicates that the operating system was unable to schedule the PDF interpreter thread 310 and that the system was over-scheduled.

Returning to the step 930, if the queue 320 is not empty, control follows a NO arrow to the step 970 which finishes examining the queue 320 and the mode remains in a parallel mode. If the queue 320 is empty, after having blocked when it was full, control follows a YES arrow to a step 940, performed by the processor $1505^{(1)}$, which increases a full_empty count. A following step 950, performed by the processor $1505^{(1)}$, determines if this count is above a threshold. If this is the case, control follows a YES arrow to a step 960, performed by the processor $1505^{(1)}$, which it indicates that the PDL interpreter thread 310 is not running concurrently with the DL builder thread 330. Since the PDL interpreter thread 310 and DL builder thread 330 are not running concurrently the processing mode is set to serial rather than parallel, and the full_empty count is reset to zero for future tests. The process 820 is then directed to the step 970 which finishes examining the queue 320 with the mode now set to serial. Returning to the step 950, if the count is not above the threshold, control follows a NO arrow to the step 970 which finishes examining the queue 320 and the mode remains in a parallel mode. From the step 970, control is directed to the step 740 in FIG. 7.

Figure 10:
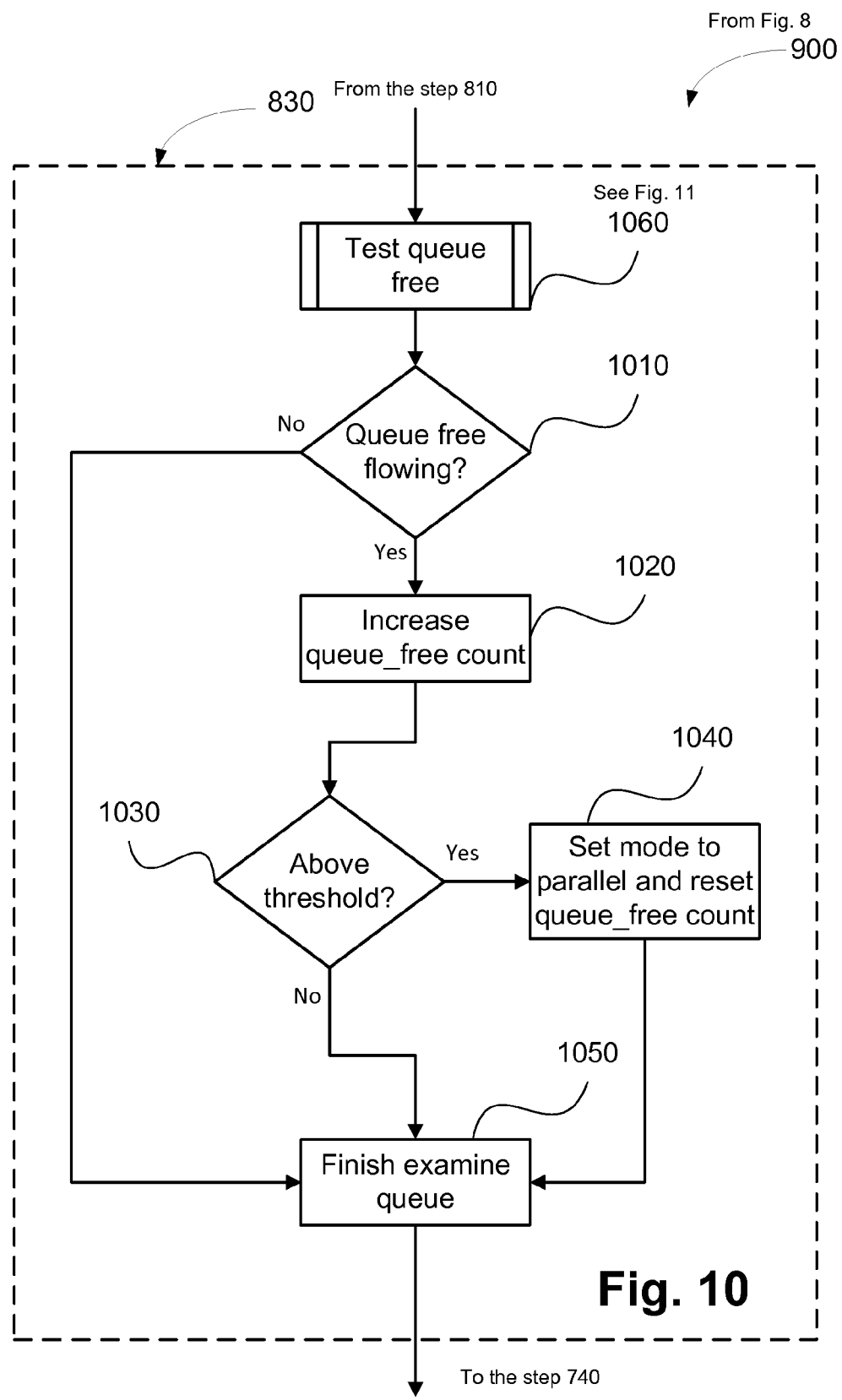
FIG. 10 is a schematic flow diagram illustrating a method of examining a queue to determine if object definitions should be processed in parallel or remain being processed in series, as used in the method of FIG. 8.
Figure 11:
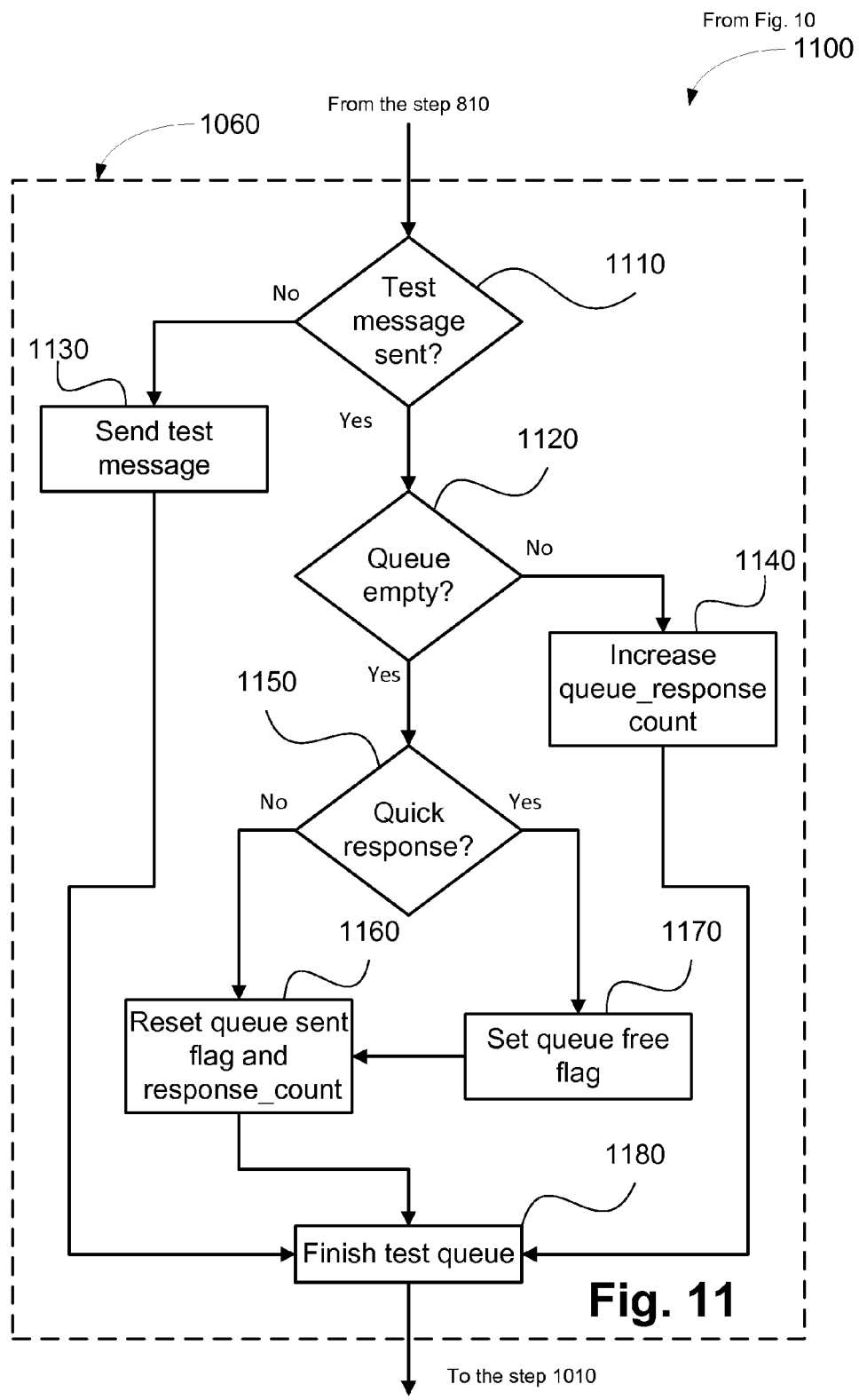
FIG. 11 is a schematic flow diagram illustrating a method of testing a queue to determine if it is free flowing, as used in the method of FIG. 10.
Figure 12A:
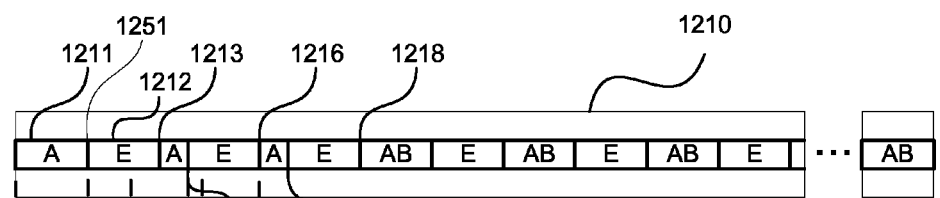
FIGS. 12A-12D depict example timing diagrams showing the execution schedule of tasks on an operating system when using a ASMT arrangement.
Figure 12B:
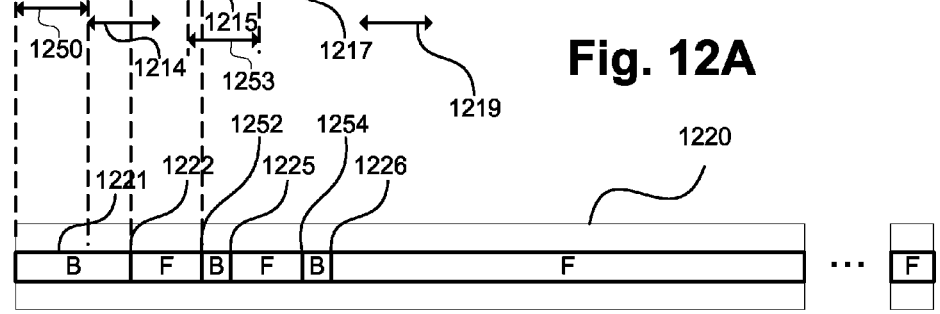
Figure 12C:
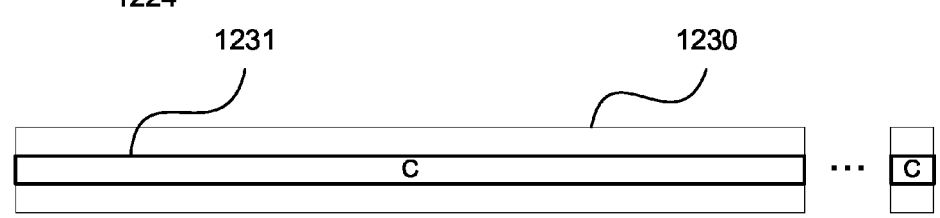
Figure 12D:
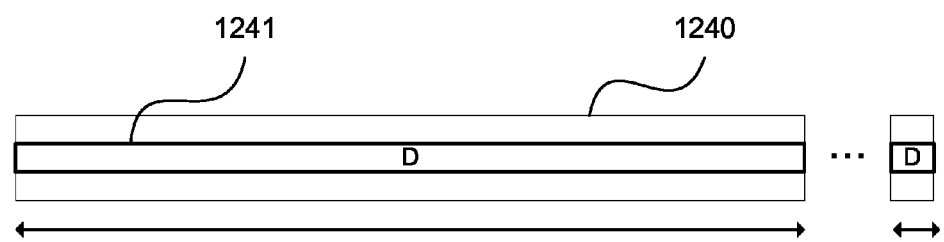

When processing has been switched to serial mode, it is advantageous to return to parallel mode when the system is no longer over-scheduled. For example, if the system became over-scheduled due to processing high-priority system tasks, upon completion of these tasks, the processing mode can return to parallel mode operation, allowing the PDL interpreter and DL building tasks to once again operate concurrently, respectively performed by the processor $1505^{(1)}$ and the processor $1505^{(2)}$. FIG. 10 and FIG. 11 show the processing method of the conditions required to return to processing in a parallel mode after processing has changed to processing in a serial mode.

FIG. 10 is a schematic flow diagram illustrating in more detail the process 830 for examining the queue 320 when the PDL interpreter and DL builder tasks are executed sequentially in a serial mode, to determine if processing should switch to parallel mode.

The process 830 is entered from the step 810 in FIG. 8, after which a step 1060, performed by the processor $1505^{(1)}$, determines if the queue 320 is free flowing. In a test step 1010 if this is not the case, then control follows a NO arrow to a step 1050, performed by the processor $1505^{(1)}$, which finishes examining the queue, the mode remains in a serial mode, and the process 830 is directed to the step 740 in FIG. 7. If the queue 320 is free flowing, then control follows a YES arrow to a step 1020, performed by the processor $1505^{(1)}$, which increments a queue_free count. Thereafter, a test step 1030, performed by the processor $1505^{(1)}$, determines if the queue_free count is above a threshold. If this is the case, then a step 1040, performed by the processor $1505^{(1)}$, (a) sets the mode state flag to return to parallel mode processing, and (b) resets the queue_free count. The process 830 is then directed to the step 1050 which finishes examining the queue 320 with the mode now set to parallel. Returning to the step 1030, if the count was not above the threshold control follows a NO arrow to the step 1050, which finishes examining the queue 320 and the mode remains in a serial mode.

FIG. 11 is a schematic flow diagram illustrating in more detail the process 1060 in FIG. 10 for testing the queue 320 to determine if it is free flowing. The process 1060 is entered from the step 810 in FIG. 8, and commences with a test step 1110, performed by the processor $1505^{(1)}$, when the serial mode of task execution starts. The first time through the process, the test step 1110 adds a test message to the message queue 320 so that it can be monitored to determine whether the message queue is free flowing. On entry to the queue checking process, the step 1110 tests a message_sent flag to determine if a test message has been added to the message queue 320. If a test message has not been sent, control follows a NO arrow to a step 1130, performed by the processor $1505^{(1)}$, which sends a test message and sets the message_sent flag to indicate that the test message has been sent.

The process 1060 is then directed to a step 1180, performed by the processor $1505^{(1)}$, which exits the process to the step 1010, performed by the processor $1505^{(1)}$, with the queue free flowing flag not set. On a subsequent iteration through the queue checking process 1110, the message_sent flag is checked to determine if the test message has been sent. The flag has been set from the previous iteration through the process 1110, and so the process 1060 follows a YES arrow to a step 1120, performed by the processor $1505^{(1)}$, which checks the queue 320 to determine if the queue 320 is empty.

The checking process 1120 depends on the queue implementation, which can include checking to determine if the queue's head and tail pointers point to the same position in the queue, or checking to determine whether the number of items in the queue is zero. If the queue is not empty, this indicates that the DL builder task was not woken by the Operating System when the test message was inserted, and accordingly, that the system is still over-scheduled. In this case control follows a NO arrow to a step 1140, performed by the processor $1505^{(1)}$, which increments a queue_response counter to record that the DL Builder task is not active. The process 1060 is then directed to a step 1180, performed by the processor $1505^{(1)}$, which exits the process 1060 to the step 1010 with the queue free flowing flag not set.

On subsequent iterations through the queue checking process 1060, while the test message remains in the queue 320, the queue_response count continues to increment until the Operating System 1553 schedules the DL Builder task for execution leading to the consumption of the test message. The queue is then empty. After the consumption of the test message by the DL Builder thread, during the next iteration through the queue checking process 1110 the message_sent flag recording the sending of the test message is still set. Accordingly, the process 1060 follows a YES arrow to the step 1120, performed by the processor $1505^{(1)}$, which tests the queue to determine if the queue is empty. If this is the case because the DL Builder task has consumed the test message, the queue is empty and control follows a YES arrow to a step 1150, performed by the processor $1505^{(1)}$, which compares the queue_response count against a predetermined threshold to determine if the DL Builder task responded quickly to the test message. This effectively determines if the test messages are remaining in the queue 320 for more than a predetermined time. Depending on the value of the response_count, two outcomes are possible:

- If the step 1150 determines that the response_count is above the predetermined threshold, the DL Builder thread is determined to not be responding quickly to messages added to the queue, and so control follows a NO arrow from the step 1150 to a step 1160, performed by the processor $1505^{(1)}$, which resets the state of the queue checking process by resetting the message_sent flag indicating that a test message has been sent, and also by resetting the response_count. This allows the queue checking process to begin again by sending another test message 1130 on the next iteration through the queue checking process;
- If the step 1150 determines that the response_count is less than or equal to the predetermined threshold, then the DL Builder thread is determined to be responding quickly to messages added to the queue, and so control follows a YES arrow to a step 1170, performed by the processor 1505[(1)], which sets the queue_free to indicate to the calling process 830 that the queue is now freely flowing, which is an enabling condition for determining whether the task processing mode should revert back to parallel mode. The process 1060 is then directed to the step 1160.

Example(s)/User Case(s)

FIGS. 12A-12D shows the performance/timing of the ASMT arrangements compared to current arrangements depicted in FIGS. 6A-6D.

FIGS. 12A-12D depict timing diagrams illustrating the performance gains achieved when the PDL interpreter thread 310 and DL builder thread 330 do not run concurrently and are on an over-scheduled system. Four processors 1210, 1220, 1230 and 1240 are running four tasks namely a first task A (ie 1211), a second task B (ie 1221), C (ie 1231) and D (ie 1241) respectively. Tasks A and B run concurrently at first during a time period 1250. A third Task E (ie 1212) interrupts Task A at a time 1251 and runs for a time period 1214 on the first processor 1210, thus interfering with the parallel processing mode. Task B finishes processing messages in the queue 320 on the second processor 1220 at a time 1222. Task F (ie 1222) runs on the second processor 1220 for the maximum time slice 1224. Task E runs for the maximum time slice duration 1214. Task A resumes processing on the first processor 1210 at a time 1213 but can only run until a time 1215, as it takes the time period from 1213 to 1215 to fill the queue 320, at which time the Task A blocks. The Operating System schedules Task E (ie 1212) to run from the time 1215 in place of Task A for the maximum time slice duration 1253. The message queue 320 is full at this point.

As noted above, Task F runs for the maximum time slice 1224. Task B resumes processing at a time 1252 but can only run until a time 1225 which is the time taken to process the messages in the queue 320. The Operating System schedules Task F to run in place of Task B from a time 1225. The message queue 320 is empty at this point. Task A resumes at a time 1216 and sees an empty queue 320, this completes one full empty cycle count. Task A runs until a time 1217 which is the time taken to fill the queue 320. The message queue 320 is full again. Task E again runs from the time 1217 after Task A blocks. Task F runs for the maximum time slice from the time 1225 to a time 1254. Task B resumes again from the time 1254 and processes the message in the queue 320 until a time 1226 at which time the message queue 320 is empty again. Task A resumes from a time 1218 and sees an empty queue, this completes another full empty cycle count.

The Processor 1210 then changes to serial mode and executes both tasks A&B during a time period 1219. Execution time of tasks A&B are able to use the maximum time slice period 1219. As tasks A&B are able to run utilising a maximum time slice, this results in quicker execution than is typically achieved by current arrangements, as was shown in FIGS. 6A-6D.

FIGS. 13A-13G and 14A-14I depict the states of the queue 320 when going from operating in parallel mode to serial mode due to an over-scheduled system and back again.

FIG. 13A shows an example page. The process starts as detailed in FIG. 7. An object 'a' is interpreted by the step 720. The queue 320 is examined to determine the current mode in the step 730. The default processing mode starts out as not serial as determined by the step 810, i.e. in parallel. Accordingly the queue 320 is examined when in parallel mode by the step 820. FIG. 13B shows the queue size to be 6, ie the occupancy of the queue is six items of data. The queue 320 is found not to be full by the step 910. Examination of the queue finishes according to the step 970. The processing mode is parallel as determined by the step 740. The 'a' object is added by the step 750 to the queue 320 to be processed by the DL builder thread 330. It is not the last object to be interpreted in the document as determined by the step 770. The interpreting step 720 then repeats for the next five objects 'b', 'c', 'd', 'e' and 'f'. Six objects 'a', 'b', 'c', 'd', 'e' and 'f' now fill the queue as shown in FIG. 13B. The DL builder thread 330 is unable to run as other threads are running on the other CPU processors.

An object 'g' is interpreted by the step 720. The queue is examined to determine the current mode by the step 730. The processing mode is found not to be 'serial' by the step 810. The queue is examined when in parallel mode by the step 820. This queue 320 is full as determined by the step 910. The thread blocks until the queue 320 is not full as determined by the step 920. During this blocked time only one object 'a' is processed. This can happen because is most cases the PDL interpreter runs faster than the DL builder. Five objects 'b', 'c', 'd', 'e' and 'f' are now in the queue 320 as shown in FIG. 13C. The queue 320 is not empty as determined by the step 930. Examination of the queue finishes as determined by the step 970. The processing mode is parallel as determined by the step 740. The 'g' object is added as determined by the step 750 to the queue 320. Six objects 'b', 'c', 'd', 'e', 'f' and 'g' now fill the queue as shown in FIG. 13D. It is not the last object as determined by the step 770.

An object 'h' is interpreted by the step 720. The queue is examined to determine the current mode as determined by the step 730. The processing mode is not 'serial' as determined by the step 810. The queue is examined when in parallel mode as determined by the step 820. This queue 320 is full as determined by the step 910. The thread blocks until the queue 320 is not full as determined by the step 920. During the time that the PDL interpreter thread 310 is blocked, the entire queue 320 of six objects is processed by the DL builder thread 330. The queue 320 is now empty as shown in FIG. 13E.

The fact that the entire queue 320 is processed before the PDL interpreter thread 310 wakes up indicates that during the blocked time the PDL interpreter thread 310 is unable to wake as objects are being processed by the DL builder thread 330. i.e. that the two threads, the PDL interpreter 310 and DL builder 330 threads were not running concurrently as another thread was scheduled by the operating system. The queue 320 is empty as determined by the step 930. The full_empty count is increased as determined by the step 940. The queue 320 goes from being full before blocking to empty after blocking. The full_empty count must reach a threshold before changing to serial mode to ensure the non-concurrent state is persistent. In this example we use a simple threshold of one. The count is not above the threshold as determined by the step 950. Examination of the queue finishes as determined by the step 970. The processing mode is 'parallel' as determined by the step 740. The 'h' object is added by the step 750 to the queue 320. It is not the last object as determined by the step 770.

The next five objects 'i', 'j', 'k', 'l' and 'm' are added to the queue 320 in a similar fashion to objects 'b', 'c', 'd', 'e' and 'f'. Six objects 'h', 'i', 'j', 'k', 'l' and 'm' now fill the queue as shown in FIG. 13F.

An object 'n' is interpreted by the step 720. The queue is examined to determine the current mode by the step 730. The processing mode is not 'serial' as determined by the step 810. The queue is examined when in parallel mode by the step 820. This queue 320 is full as determined by the step 910. The thread blocks until the queue 320 is not full as determined by the step 920. During this blocked time the entire queue 320 of six objects is processed. The queue 320 is now empty as shown in FIG. 13G. The queue 320 is empty as determined by the step 930. The full_empty count is increased by the step 940, the full-empty count now being two. The count is above the threshold as determined by the step 950. A flag is set to switch the processing mode to 'serial' and the full_empty count is reset by the step 960. Examination of the queue finishes as determined by the step 970. The processing mode is 'serial' as determined by the step 740. The 'n' object is built by the step 760 for the display list in the PDL interpreter thread 310. It is not the last object as determined by the step 770.

An object 'o' is interpreted by the step 720. The queue is examined to determine the current mode by the step 730. The processing mode is 'serial' as determined by the step 810. The queue is examined when in serial mode by the step 830. The queue is tested to see if it is free flowing by the step 1060. A test message has not already been sent as determined by the step 1110. A test message is sent by the step 1130. A test message is now in the queue as shown in FIG. 14A. Testing of the queue is finished as determined by the step 1180. The queue is not free flowing as determined by the step 1010, and no flag has been set. Examination of the queue finishes as determined by the step 1050. The processing mode is 'serial' as determined by the step 740. The 'o' object is built by the step 760 for the display list in the PDL interpreter thread 310. It is not the last object as determined by the step 770. For the purposes of the present disclosure the fact the DL thread is scheduled by the operating system instantaneously indicates that the queue is free flowing, i.e. both threads are running concurrently. Otherwise, if the test messages are not taken out quickly (because it requires more time for the operating system to schedule the DL thread to process the test messages), the threads are not running concurrently.

An object 'p' is interpreted by the step 720. The queue is examined to determine the current mode by the step 730. The processing mode is 'serial' as determined by the step 810. The queue is examined when in serial mode by the step 830. The queue is tested to see if it is free flowing by the step 1060. A test message has already been sent as determined by the step 1110. The queue is not empty as determined by the step 1120. A test message remains in the queue as shown in FIG. 14B. The response count is increased by the step 1140. For each object processed in the PDL interpreter thread 310 while in serial mode the response count is increased if a test message has not been processed. A low response count indicates a quick response from the DL builder thread 330 indicating it is running concurrently again with the PDL interpreter thread 310. Testing of the queue is finished as determined by the step 1180. The queue is not free flowing as determined by the step 1010, and no flag has been set. Examination of the queue finishes as determined by the step 1050. The processing mode is 'serial' as determined by the step 740. The 'p' object is built by the step 760 for the display list in the PDL interpreter thread 310. It is not the last object as determined by the step 770.

An object 'q' is interpreted by the step 720. The queue is examined to determine the current mode by the step 730. The processing mode is 'serial' as determined by the step 810. The queue is examined when in serial mode by the step 830. The queue is tested to see if it is free flowing by the step 1060. A test message has already been sent as determined by the step 1110. The queue is not empty as determined by the step 1120. A test message still remains in the queue as shown in FIG. 14C. The response count is increased by the step 1140. Testing of the queue is finished by the step 1180. The queue is not free flowing as determined by the step 1010, and no flag has been set. Examination of the queue finishes as determined by the step 1050. The processing mode is 'serial' as determined by the step 740. The 'q' object is built by the step 760 for the display list in the PDL interpreter thread 310. It is not the last object as determined by the step 770.

An object 'r' is interpreted by the step 720. The queue is examined to determine the current mode by the step 730. The processing mode is 'serial' as determined by the step 810. The queue is examined when in serial mode by the step 830. The queue is tested to see if it is free flowing by the step 1060. A test message has already been sent by the step 1110. The queue is not empty as determined by the step 1120. A test message still remains in the queue as shown in FIG. 14D. The response count is increased by the step 1140. Testing of the queue is finished by the step 1180. The queue is not free flowing as determined by the step 1010, and no flag has been set. Examination of the queue finishes by the step 1050. The processing mode is 'serial' as determined by the step 740. The 'r' object is built by the step 760 for the display list in the PDL interpreter thread 310. It is not the last object as determined by the step 770.

An object 's' is interpreted by the step 720. The queue is examined to determine the current mode by the step 730. The processing mode is 'serial' as determined by the step 810. The queue is examined when in serial mode by the step 830. The queue is tested to see if it is free flowing by the step 1060. A test message has already been sent as determined by the step 1110. The queue is empty as determined by the step 1120. A test message is no longer in the queue shown in FIG. 14E. The queue_response count was above a predetermined threshold as determined by the step 1150 and was not determined to be short enough to be a quick response. The queue_response count and queue sent flag are reset by the step 1160. Testing of the queue is finished by the step 1180. The queue is not free flowing as determined by the step 1010, and no flag has been set. Examination of the queue finishes as determined by the step 1050. The processing mode is 'serial' as determined by the step 740. The 's' object is built by the step 760 for the display list in the PDL interpreter thread 310. It is not the last object as determined by the step 770.

An object 't' is interpreted by the step 720. The queue is examined to determine the current mode by the step 730. The processing mode is 'serial' as determined by the step 810. The queue is examined when in serial mode by the step 830. The queue is tested to see if it is free flowing by the step 1060. A test message has not already been sent as determined by the step 1110. A test message is sent by the step 1130. A test message is now in the queue as shown in FIG. 14F. Testing of the queue is finished by the step 1180. The queue is not free flowing as determined by the step 1010, and no flag has been set. Examination of the queue finishes as determined by the step 1050. The processing mode is 'serial' as determined by the step 740. The 't' object is built by the step 760 for the display list in the PDL interpreter thread 310. It is not the last object as determined by the step 770.

An object 'u' is interpreted by the step 720. The queue is examined to determine the current mode as determined by the step 730. The processing mode is 'serial' as determined by the step 810. The queue is examined when in serial mode by the step 830. The queue is tested to see if it is free flowing by the step 1060. A test message has already been sent as determined by the step 1110. The queue is not empty as determined by the step 1120. A test message still remains in the queue as shown in FIG. 14G. The response count is increased by the step 1140. Testing of the queue is finished by the step 1180. The queue is not free flowing as determined by the step 1010, and no flag has been set. Examination of the queue finishes as determined by the step 1050. The processing mode is 'serial' as determined by the step 740. The 'u' object is built by the step 760 for the display list in the PDL interpreter thread 310. It is not the last object as determined by the step 770.

An object 'v' is interpreted by the step 720. The queue is examined to determine the current mode by the step 730. The processing mode is 'serial' as determined by the step 810. The queue is examined when in serial mode by the step 830. The queue is tested to see if it is free flowing by the step 1060. A test message has already been sent as determined by the step 1110. The queue is empty as determined by the step 1120. A test message is no longer in the queue shown in FIG. 14H. The queue_response count was above a predetermined threshold as determined by the step 1150 and was not determined to be short enough to be a quick response. The flag is set to indicate the queue is free flowing by the step 1170. The response count and queue sent flag are reset by the step 1160. Testing of the queue is finished by the step 1180. The queue is free flowing as determined by the step 1010, and a flag has been set. The queue free flowing count is increased by the step 1020. The free flowing count is above a threshold as determined by the step 1030. A threshold may be set to ensure the two threads remaining running concurrently for a time before switching back to parallel mode. A flag is set to switch back to parallel mode and the free flowing count is reset by the step 1040. Examination of the queue finishes as determined by the step 1050. The processing mode is 'parallel' as determined by the step 740. The 'v' object is added to the queue by the step 750. It is not the last object as determined by the step 770.

The next four objects 'w', 'x', 'y', and 'z' are added to the queue in a similar fashion to objects 'b', 'c', 'd', 'e' and 'f', as shown in FIG. 14I. It is the last object as determined by the step 770. Interpreting of the document ends as determined by the step 780.

INDUSTRIAL APPLICABILITY

The arrangements described are applicable to the computer and data processing industries, particularly as implemented using multi-core processors.

The foregoing describes only some embodiments of the present invention, and modifications and/or changes can be made thereto without departing from the scope and spirit of the invention, the embodiments being illustrative and not restrictive.

The invention claimed is:

1. A method of processing a task on a processor adapted to process a plurality of tasks, the method comprising the steps of:
    processing the task by a producer thread and a consumer thread running concurrently, each thread executing at least a portion of the task, the threads communicating via a message queue comprising a plurality of messages produced by the producer thread to be processed by the consumer thread;
    detecting a transition of an occupancy state of the message queue from a substantially full state to a substantially empty state, wherein the state of the message queue is determined—based on the plurality of messages in the message queue to be processed by the consumer thread, and the transition of an occupancy state of the message queue from a substantially full state to a substantially empty state is caused by a further task interfering with processing of the task; and
    in the event of detecting the transition, processing the task sequentially by a single thread.

2. The method according to claim 1, wherein detecting a transition of an occupancy state of the message queue further comprises determining a rate of change in the number of messages in the message queue produced by a first thread to be processed by a second thread.

3. The method according to claim 2, wherein the task is processed sequentially in response to detecting that the determined rate of change exceeds a predetermined threshold.

4. The method according to claim 1, wherein the further task interferes with processing of the task by the producer thread and the consumer thread running concurrently.

5. The method according to claim 1, wherein the step of detecting the transition comprises the steps of:
    sending a system call which (a) places the producer thread into an idle state if the occupancy state of the message queue becomes full, and subsequently (b) places the producer thread into an active state when the occupancy state of the message queue next becomes less than full; and
    detecting occurrence of the transition if the occupancy state of the message queue is substantially empty when the producer thread is placed into said active state.

6. The method according to claim 1, further comprising reverting to processing the task in a parallel processing mode by the producer thread and the consumer thread running concurrently if, while the task is being processed sequentially, the consumer thread is operating concurrently with the producer thread.

7. The method according to claim 6, wherein the step of determining if the consumer thread is operating concurrently with the producer thread comprises the steps of:
    sending a test message to the consumer thread; and
    establishing that the consumer thread is operating concurrently with the producer thread if the test message remains in the message queue for less than a predetermined time.

8. The method according to claim 1, comprising the steps of establishing that the system hosting the threads is over-scheduled if the transition is detected.

9. The method according to claim 1, further comprising allocating, by an operating system executing of the computer, the producer thread and the consumer thread dependent upon a request from a software application for performing the task.

10. A non-transitory computer-readable storage medium storing a program for directing a plurality of processors to perform a method of processing a task on a processor adapted to process a plurality of tasks, the method comprising the steps of:
    processing the task by a producer thread and a consumer thread running concurrently, each thread executing at least a portion of the task, the threads communicating via a message queue comprising a plurality of messages produced by the producer thread to be processed by the consumer thread;

detecting a transition of an occupancy state of the message queue from a substantially full state to a substantially empty state, wherein the state of the message queue is determined based on the plurality of messages in the message queue to be processed by the consumer thread, and the transition of an occupancy state of the message queue from a substantially full state to a substantially empty state is caused by a further task interfering with processing of the task; and in the event of detecting the transition, processing the task sequentially by a single thread.

11. A system, comprising:

a plurality of processors; and a memory storing a program for directing the plurality of processors to perform a method of processing a task on a processor adapted to process a plurality of tasks, the method comprising the steps of:

processing the task by a producer thread and a consumer thread running concurrently, each thread executing at least a portion of the task, the threads communicating via a message queue comprising a plurality of messages produced by the producer thread to be processed by the consumer thread;

detecting a transition of an occupancy state of the message queue from a substantially full state to a substantially empty state, wherein the state of the message queue is determined based on the plurality of messages in the message queue to be processed by the consumer thread, and the transition of an occupancy state of the message queue from a substantially full state to a substantially empty state is caused by a further task interfering with processing of the task; and in the event of detecting the transition, processing the task sequentially by a single thread.

* * * * *